United States Patent
Rust et al.

(10) Patent No.: US 8,293,158 B2
(45) Date of Patent: Oct. 23, 2012

(54) BLEND OF PLASTICS WITH WOOD PARTICLES

(75) Inventors: Harald Rust, Bochum (DE); Holger Sasse, Aschersleben (DE)

(73) Assignees: Entex Rust & Mitschke GmbH (DE); Novo-Tech GmbH & Co. KG (DE)

( * ) Notice: Subject to any disclaimer, the term of this patent is extended or adjusted under 35 U.S.C. 154(b) by 380 days.

(21) Appl. No.: 12/419,804

(22) Filed: Apr. 7, 2009

(65) Prior Publication Data

US 2009/0236766 A1    Sep. 24, 2009

Related U.S. Application Data

(63) Continuation-in-part of application No. PCT/EP2007/009140, filed on Oct. 22, 2007.

(30) Foreign Application Priority Data

Nov. 15, 2006 (DE) .................. 10 2006 054 204
Oct. 15, 2007 (EP) ...................... 07020157

(51) Int. Cl.
*B29C 47/60* (2006.01)
*B29C 47/00* (2006.01)
*D01F 1/02* (2006.01)

(52) U.S. Cl. .............. 264/211.23; 264/177.2; 264/211; 524/13

(58) Field of Classification Search ............... None
See application file for complete search history.

(56) References Cited

U.S. PATENT DOCUMENTS

| | | | | |
|---|---|---|---|---|
| 3,530,534 | A * | 9/1970 | Pomper | 425/209 |
| 4,124,307 | A * | 11/1978 | Anisic | 366/76.3 |
| 5,129,728 | A * | 7/1992 | Winstead | 366/79 |
| 5,585,054 | A * | 12/1996 | Evans | 264/40.4 |
| 5,653,534 | A | 8/1997 | Matsumoto et al. | |
| 5,776,281 | A * | 7/1998 | Evans | 156/244.17 |
| 5,973,035 | A * | 10/1999 | Medoff et al. | 524/13 |
| 6,074,084 | A * | 6/2000 | Kolossow | 366/84 |
| 6,280,667 | B1 * | 8/2001 | Koenig et al. | 264/68 |
| 6,479,002 | B1 | 11/2002 | Becker et al. | |
| 2005/0087904 | A1 * | 4/2005 | Bryan | 264/148 |
| 2008/0093763 | A1 * | 4/2008 | Mancosh et al. | 264/75 |

FOREIGN PATENT DOCUMENTS

| | | | |
|---|---|---|---|
| DE | 2941206 | * | 4/1981 |
| DE | 19534644 | | 3/1997 |
| DE | 10228191 | | 1/2004 |
| DE | 10310510 | | 5/2005 |
| DE | 10356423 | | 6/2005 |
| DE | 102004005034 | | 8/2005 |

(Continued)

OTHER PUBLICATIONS

EPO/ISA, International Search Report for international application No. PCT/EP20071009140, Apr. 10, 2008.

(Continued)

*Primary Examiner* — Jeffrey Wollschlager
(74) *Attorney, Agent, or Firm* — Stites & Harbison, PLLC; David W. Nagle, Jr.; Terry L. Wright

(57) ABSTRACT

According to the invention blends of wood particles and plant particles and plastic are generated in an extruder thereby that the plastic is converted separately into a liquid melt before the joining takes place.

21 Claims, 11 Drawing Sheets

FOREIGN PATENT DOCUMENTS

| | | | |
|---|---|---|---|
| DE | 102004005058 | | 8/2005 |
| DE | 102004034039 | * | 2/2006 |
| EP | 1262293 | | 12/2002 |
| EP | 1262294 | | 12/2002 |
| EP | 1297933 | | 4/2003 |
| FR | 2564374 | | 11/1985 |
| WO | 02/103113 | | 12/2002 |

OTHER PUBLICATIONS

IB on behalf of EPO/ISA, International Preliminary Report on Patentability and Written Opinion of the International Searching Authority for international application No. PCT/EP2007/009140, Jun. 10, 2009.

* cited by examiner

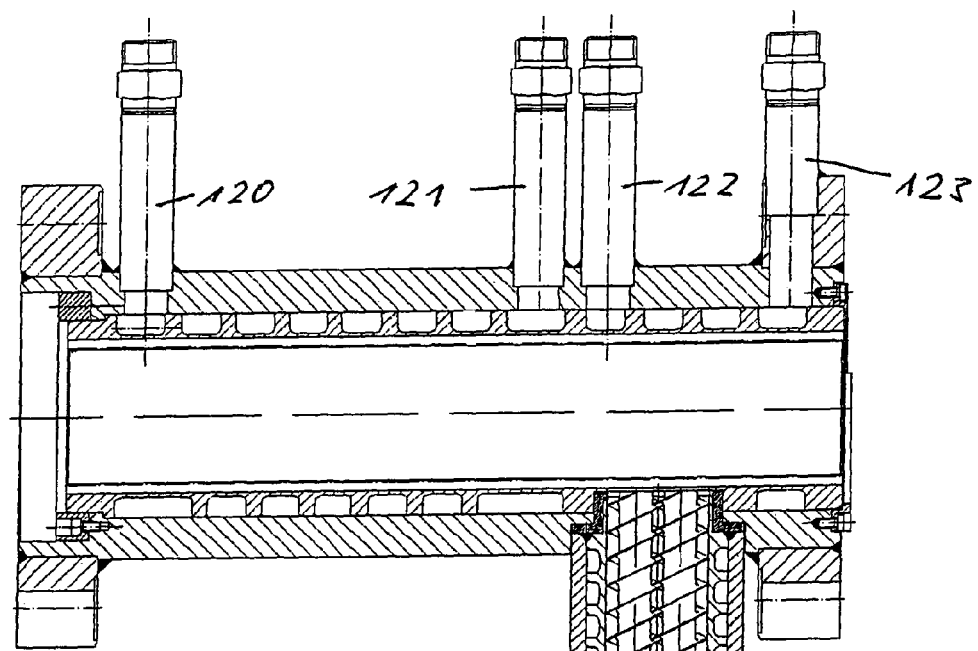
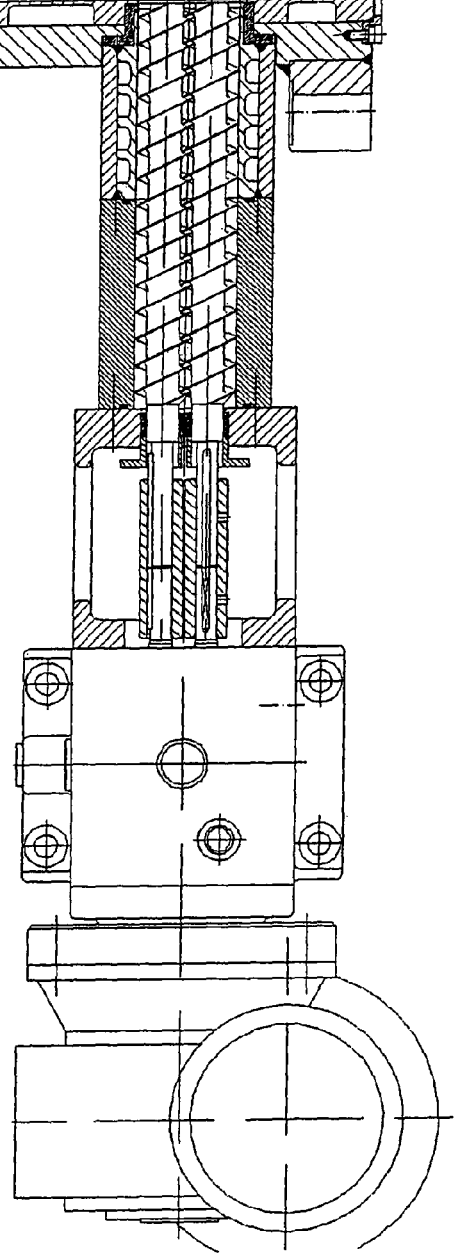
Fig. 7

BLEND OF PLASTICS WITH WOOD PARTICLES

CROSS-REFERENCE TO RELATED APPLICATIONS

The present application is a continuation-in-part of PCT International Application No. PCT/EP2007/009140 filed on Oct. 22, 2007 (and designating the United States), an application which itself claims priority to European Patent Application No. 07020157.9 filed on Oct. 15, 2007 and German Patent Application No. 102006054204.5 filed on Nov. 15, 2006.

FIELD OF THE INVENTION

The invention concerns the blend of plastics with wood particles or other plant particles or the like. As far in the following only wood or only wood particles are mentioned, then this includes other plants and plant particles.

BACKGROUND OF THE INVENTION

Plastics are used in manifold applications
  molded parts, work pieces, blocks, boards, films, webs, coatings, tubes, hoses, bars, rods, profiles, bands, strings, wires, bristles, grids, adhesives, lacquers, glues, pastes, mastics, binders,
  colours, plasters, spittle, casting compounds, sealing masses, melt and coating materials, gels,
  filaments, brins, threads, silks, strands, mats, fleeces, fabrics Plastics can consist of monomers and/or polymers. Often it is a blend, whereas also blends of other materials than plastics are found. This applies especially for the production of plastic foam.

For the compounding of plastics the use of extruders is preferred.

By means of an extruder the used material can be very well melted, mixed and homogenized and dispersed respectively.

Moreover, the used material can simultaneously be heated or cooled. For heating or cooling there are heating and cooling lines in the extruder shell and, where necessary, in the spindles. In addition, the deformation of the used material performed by the extruder spindles causes a considerable heating.

Very difficult materials can be blended in the extruder. Wood and plastics are belonging to the materials difficult to blend. Thereby the wood is supplied in small particles into the extruder and there wrapped with plastic. In order to provoke the wrapping the plastic must be plasticised. This happens under corresponding heating and under pressure. However, the heat is only very badly transported by the wood. Moreover, the wood is very porous. As per an older proposal there might be the danger that the plastic will be pressed disproportionately into the pores and will be unevenly distributed and no all-sided wrapping of the wood particles will take place.

The wool-plastic blend is also described as wood substitute.

Wood is used in several fields of application. Furniture, interior fittings, trade fair construction, even automotive linings.

With regard to the furniture you have to distinguish between furniture where wood is only construction material and furniture where wood is used as visible surface.

For upholstered furniture wood is mostly used as construction material.

Generally all upholsteries have a solid substructure, e.g. a frame, also called rack. In and at the rack there are optionally mounted seats, backrests and armrests as well as feet.

Optionally the rack forms also directly the seat, backrests and armrests or vice versa. The material out of which the rack is produced is the construction material.

Traditionally the frames for upholsteries are produced of wood. Boards and sticks are used. Wood has the advantage that the single parts can be connected with each other as well as with the upholstery and the upholstery cover by the so-called stapling. For the stapling u-shaped fasteners are used. The fastener replaces the bullen-nails of the former days.

Other furniture show the wood as visible, decoration or ornament areas respectively.

To some extent only specific rare kinds of wood fulfill the requested requirements for this. Rare lumber is relatively expensive. Since long it is therefore state of the technology to cut veneers out of rare wood which forms the visible surface. Veneers comprise thin, filmy woodcuts. A considerable waste occurs when the veneers shall be processed like the wood is grown.

By the blend of wood and plastic an advantageous wood substitute occurs.

Instead of wood also other comminuted plants can be used. Optionally an extrudate is generated from plastic and wool and other additives, which is foamed or unfoamed. At low wood proportion in the extrudate you speak of an armouring or about the use of wood as filler. In the USA you speak of a wood substitute if the wood proportion in the blend has reached a weight proportion of 50%. For example, boards made of the blend of wool and plastic with the indicated blending proportion are common practice in the USA. The US-market accepts this. An example for the blends usual in the USA shows the WO 02/103113A.

The European market only accepts a wool substitute in the visible area only, if the appearance of the material is essentially similar to wood. Thereby 70% and more of wood are required.

However, an enduring outdoor application free of defects could up to now not be reached with such a material.

For the use of other plant components, e.g. straw instead of wood is similar with the wood. To some extent the plant part have a lower stability than wood. As far as the stability is concerned the blend must be changed accordingly. As further plant components also grain grist and comminuted hay can be used.

As per an older proposal the plastic proportion of the extrudate shall be reduced as far as possible. Thereby wood proportions at the extrudate of 60 to 95 wght % referred to the blend are aimed for. The optimal plastic proportion shall be added against the blend proportions, the processing and the intended characteristic values of the blend.

As per the older proposal the dimensions of the plant particles are destined by the traversing of the particles in the extruder when using traditional extruders. Thereby the traversing is determined by the clearance of the moving extruder parts in the extruder and by the opening width of the die gap. The traversing can be determined by means of the known machine data. Then the dimensions of the plant particles, admissible for the respective extruder, can be determined. For safety reasons, you can choose smaller dimensions of the plant particles than the above described traversing.

Alternatively, as per the older proposal the traversing of the extruder can be adjusted to the requested particle size. This is done by means of the new construction of the extruder or the exchange of construction parts, e.g. the exchange of the extruder screw, the die or the liner in the extruder housing. Modern extruders have a liner in the extruder housing, in which the screws are rotating.

As plastics all extrudable plastics can be considered, especially Polyethylene (PE), Polystyrene (PS), Polyurethane (PU) and Polypropylene (PP). Especially preferred is the use of PE.

The bonding agents can compensate a lack of adhesion of plastics with plant particles and wood respectively.

Bonding agents generate molecular bridges at the interfaces between the materials to be connected, here the plastic.

As far as also other fillers or armouring materials/reinforcing agents like e.g. glass fibers are used, the bonding agents can also have the task to increase the adhesion to these other materials. Bonding agents can be VC (vinyl chloride)-copolymers, phenolic resins, cautchouc derivates or acrylic resins without or with PF (phenol-formaldehyde)- and EP(epoxy)-resins.

As bonding agents are known generally also EVA (ethylene-vinyl acetate-copolymers; It might also already be sufficient to make the plant particles water-repellent, i.e. to decrease the surface tension.

Traditionally the plastic is supplied as granulate with plant particles and additives into the extruder. Optionally the granulates contain already a blend of plastic and additives.

By means of drying the humidity can be reduced to every degree required for the extrusion. Not always a minimal degree of humidity is required, but optionally a destined moisture content by which you can influence the extrusion process and/or the condition of the extrudate.

So far, twin-screw extruders have been regarded as especially favourable because these extruders have:
a very high feed effect
a very good pressure build-up.

Advantageously, extruders from different elements and section of different kind of construction respectively can be assembled. Therefore it is possible to insert for the plasticising zone an element in the construction type of a twin-screw extruder, being advantageous there, and to combine this element in other extruder zones with other kinds of construction, having there advantages. Thus, a single-screw extruder section can be used in the feeding zone with which the pressure build-up can be presented advantageously. For the blend and homogenization other sections will be better.

Under pressure and temperature the plastic is melting. In the further step of the blend used through the extruder the blend will be homogenized. For the homogenization zone and the dispersion zone it is of advantage to us there extruder elements having a high mixing capacity. These are for example elements in the design of a planetary roller extruder. This element has simultaneously a high cooling effect by which the processing temperature can be controlled very exactly. Depending on type of plant and type of wood respectively and depending on the plastic an optimal processing temperature for the melt is resulting. The temperature can e.g. amount up to 200° C. at a max. dwell time (temperature loading time) of 15 min. At a shorter duration the max. temperature can be higher than at a longer duration.

At the further extrusion a differentiation must be made between the extrusion of unfoamed plastic and the extrusion of foamed plastic.

The residual moisture can serve as lubricant. The residual moisture can also enter into chemical reaction. For example the moisture can enter into reaction with the lignin of the plant particles. Surprisingly an ameliorated adhesion between wood and plastic can be caused by this. The adequate content of moisture/lignin can be tested by variation of the moisture and variation of the lignin content. Lignin is also available in customary liquid form.

In case no water is desired at the extrusion, this can be counteracted by drying of the plant particles before the extrusion. In addition or instead of the drying the moisture can be eliminated after the vaporization in the extruder by means of the degassing. The degassing can occur immediately after the vaporization. This takes place regularly in the plasticization zone. There the necessary heating takes place. This heating results from the forming works during plasticization and, if necessary, by supply of heat. The heat supply can take place e.g. via a heating-cooling system in the extruder housing.

The degassing takes place, if requested, latest directly in front of the extrusion die.

The degassing requires that the melt pressure will be reduced.

Known is also the degassing by use of two extruders in tandem arrangement at the transfer between the two extruders.

The degassing can also take place in one extruder. The necessary pressure reduction in the melt can be carried out by different measures, e.g. by change of the pitch of the screw in the extruder.

For the degassing the melt can also be taken-off out of the extruder and led via a degassing device and returned again into the extruder.

By this, the pressure control can be essentially made easier by interconnection of a melt pump. This is valid also for the pressure directly in front of the extrusion die (tool). Here the pressure can be kept additionally constant by means of the melt pump and thus the quality of the extrudate can be improved.

The higher the wool proportion in the blend, the bigger is the danger that the material will be no longer suitable for an outdoor application. The known materials decompose after some time due to steady changes of freeze/thaw. A further disadvantage of the known materials a disproportionate swelling which easily leads to bigger damages or for which oversized expansion joint must be considered.

Moreover, the wear of the extrusion line will be increased with an increasing wood proportion.

The wear reduces the efficiency of the line.

Therefore, the invention made it is business to improve the production of wood substitute made of a blend of wood particles or other plant particles.

BRIEF DESCRIPTION OF THE DRAWINGS

FIG. 7 is yet another partial cross-sectional view of the exemplary extruder of FIG. 5;

DETAILED DESCRIPTION OF THE INVENTION

Figure 1:
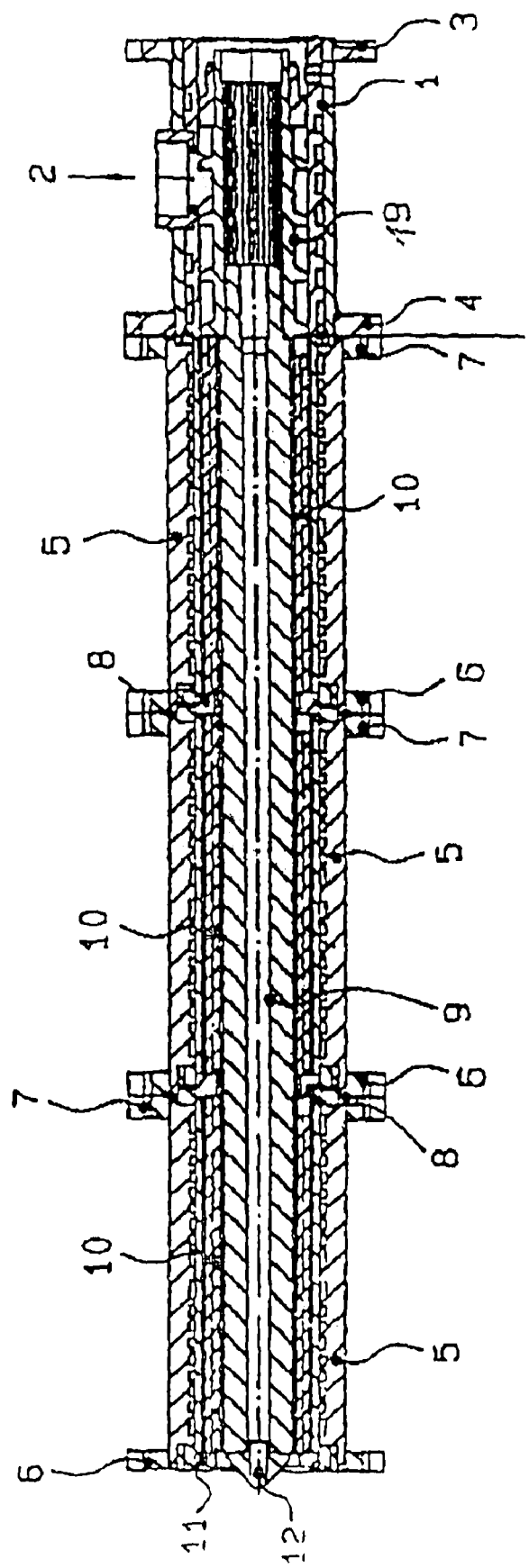
FIG. 1 is a cross-sectional view of an exemplary extruder for the production of blends of wood particles and plastic in accordance with the present invention.

Especially the following shall be achieved:
the production of materials with a better wood impression, an outdoor application of the materials should be possible, and the efficiency of the line shall be improved by decreasing of the wear. As far as in the following wood is mentioned this includes the above mentioned alternative plant particles. The desired better wood impression in comparison to the US-standard required wood proportions and plant proportions respective of min. 60 wght %, preferably 65 wght % and more.

Due to the invention, an essential process improvement will be reached by means of a blend of plastic and wood particles and other plant particles in a planetary roller extruder or planetary roller extruder section.

This application is simultaneously opposed to the awareness that high wood proportions and high plant proportions respectively lead to an intense wear in the intended planetary roller extruder or planetary roller extruder section.

Preferably the wear will be reduced in that way that the plastic will be—at least separated from wood and optionally also separated from other wear causing additives of the blend—plasticized and afterwards injected into the flow of the wood particles and that the blend will be homogenized and pressed.

To the additives can belong among others: colours, couplers for increase of the adhesion between plastic and wood, lubricants for reduction of the friction in the extruder, water repellents, stabilizers.

In the U.S. Pat. No. 6,479,002B1 is mentioned among others that the plastic will be melted separated from wood particles and other plant particles and afterward supplied to the wood particles and other plant particles. But this is not intended as solution at planetary roller extruders. Aim of this measure is to gain time which otherwise is necessary for the melting of the plastic. In this US patent specification the extruder is needed in its whole length in order to cause in a steadily repeated pressure build-up and subsequent decompression a drying of the wood and the plant particles respectively. Thereby an evaporation of the excessive water content takes place. Afterwards the water vapour shall be sucked off. The suction calls for a decrease of pressure and the use of a suction draught.

Thereby it is intended to repeat the pressure build-up with decompression so often until the required drying has been reached.

The areas of the pressure build-up and the decompression can be seen from the drawing without further ado. There are changing areas of high pitch with areas of low pitch. At the same time an intensive blending of wood and plastic shall take place. For this a counterrotating twin-screw extruder is intended. Twin-screw extruders are marked by a high pressure build-up and by a high mixing effect.

This concept cannot be transposed with a planetary roller extruder according to the invention. The intended toothing in the planetary roller extruder normally has a constant pitch over the whole length. This is opposed to the concept of changing pitch.

The use of planetary roller extruders for the production of blends of wood and plastic itself is known. This, however, is limited until the priority date of the application at hand to written considerations concerning the use of planetary roller extruders. Such considerations can be found for example in the following prints: DE 102004005058, DE 102004005034, DE 10310510, DE 10228191. All these proposals have in common that they did not become practical relevance. This is traced back to the fact the traversing of wood particles in a larger quantity in a planetary roller extruder is very difficult. This is especially valid when exceeding the limit according to the invention of 60 wght %, especially of 65 wght %. Then there exists the risk that the particles will be milled into the toothing by the rotating planets and will be built up on the tooth root surface. Then the particles will no longer be displaced from the tooth root surface of the central spindle and the tooth root surface of the toothing of the housing by the teeth of the planetary spindles. This is also valid for the particles in the tooth root surface of the toothing of the planetary spindles.

Due to the build-up of the particles in the tooth root surface a skipping over of the planets will arise which are kept during their rotation only in the toothing of the central spindle and in the toothing of the surrounding housing. At the skipping the whole toothing will be damaged. The consequence will be a total loss with corresponding operating failure for the repair. Independent of the risk of damage the plant particles cause a considerable wear at the planetary roller extruder by the build-up of particles in the tooth root surface. Now, the costs for a planetary roller extruder are much higher than the costs for single-screw extruders and twin-screw extruders. Therefore, the above considerations for the design of an extrusion line for the production of blends of wood and plastic could not be realized for reasons of acquisition cost for a planetary roller extruder.

All lines known in practice are using twin-screw extruders.

An example for this is also the line for the production of blends of wood and plastic describes in WO 02/103113.

According to the invention the acquisition cost will be reduced thereby that a planetary roller extruder will be used which supplies the wood/plant-plastic blend to several downstream single-screw extruders. Each of these single-screw extruders has the only purpose to secure the necessary pressure for a passage of the blend through the downstream die. By its outlet cross section the die defines the cross section of the outcoming strand. Thereby the same or different dies can be used. According to this different extruders form parallel production lines which are served from a joint line component with the described blend. Instead of the single-screw extruder also other extruders could be used singly or several other extruders could be used. The single-screw extruders, however, are unrivalled favourable and fulfill all described conditions.

The acquisition cost of the joint planetary roller extruder are distributed to all production lines and therefore the full impact is not to great than at the us of an independent planetary roller extruder for every production line.

Preferably the distribution of the blend is used in order to carry out a degassing over the section. The degassing can take place at the ambient air. The heat contained in the blend provokes already a degassing. The degassing can be increased by application of vacuum.

The degassing at the outlet of the planetary roller extruder can be the sole degassing place or can be completes with a known degassing at another place of the planetary roller extruder.

Optionally a storage container is intended behind the planetary roller extruder. The storage container forms a buffer by balancing fluctuations in production between the planetary roller extruder and the downstream production lines.

In the storage container the blend is kept on the intended temperature. Preferably, also in the storage container a degassing takes place.

The distributor can have different forms.

One alternative is formed by a switch extending like a knife into the approaching blend and diverting the requested quantity from the flow. By adjustment of the switch the diverted quantity can be altered. Preferably the adjustment of the switch is combined with a flowmetering so that a contact for an adjustment of the switch is given at an undercut or excess of the requested quantity. Preferably this regulation is provided with a special inertia so that not every small cavity immediately leads to an adjustment of the switch. The inertia of the regulation can be achieved thereby that it is measured in temporal intervals. The intervals have at least a length of 5 seconds, preferably a length of 10 seconds, still more preferred a length of min. 20 seconds. The inertia of the regulation can also be achieved thereby that the adjustment only reacts when achieving larger deviations from the set value. Preferably a reaction is intended at a deviation from the target quantity of mind. 5 wght %, still more preferred at a deviation of min. 10 wght % and highly preferred at a deviation of min. 20 wght %.

At two branches to two production lines one switch will be sufficient.

At three branches to three production lines two switches will be sufficient.

At four branches to four production lines three switches will be sufficient.

The number of the switches is by 1 smaller than the number of branches.

Optionally the switches are combines with an open chute. Preferable the chute has therefore a smooth floor so that the switches can be moved slightly above the floor or even when contacting the floor.

The switches are designed jointed and equipped with a servomotor.

The quantity measurement is executed optionally in the range of the feed opening or feed hopper at the downstream single-screw extruders.

The quantity measurement can also be executed in the way of a weight measurement at the chute. For this preferably directly behind the switches there is arranged resiliently a part of the branch and is there equipped with a measuring device. Thereby electrically effecting load cells can be concerned. Such load cells have a strain gauge which reacts to different loads e.g. with different resistance to an electrical current flowing through.

The interval regulation can also be combined with the described lager quantity deviation.

Preferably the set values of the regulation can be altered in order to allow for an adjustment of different required quantities of blends in the production lines. The required quantities of blends in the production lines are changing e.g. when other profiles of smaller cross sections or larger cross sections shall be produced.

The distributor can also have a distributor cone which guides the blend coming out of the extruder into a chute. From the chute there are going different branches to the downstream production lines. The distributor cone can guide the blend also directly into the branches. Then the different branches are arranged preferably around the distributor cone.

Optionally the branches are also equipped with an adjustable inlet opening and that is combined with a rotary movable distributor cone so that a sufficient blend quantity is secured in front of each inlet opening by the rotation of the distributor cone. Preferably the blend quantity will be adjusted accordingly. At interconnected buffer/storage container the outpouring blend quantity can easily be adjusted to the demand via an adjustable discharge sluice. That means, the discharge quantity out of the buffer/storage container will be changed by adjustment of the discharge sluice in case the blend quantity deviates from the target quantity in from of the inlet openings.

The adjustability of the inlet openings acts like the adjustment of the above described switch. For adjustment of the inlet opening the same aids like for the switch can be used.

Optionally the distributor cone is equipped with a rotating scraper which moves the blend quantity totally or partly successively to the different inlet openings. On the way the inlet openings are supplied with the blend in intervals. In dependency of the length and the frequency of the intervals the blend can flow into the inlet openings. Thereby the length and the frequency of the intervals can be used as control variable.

Optionally a rotating distributor plate is used instead of the distributor cone. With the distributor plate the same can be achieved as with the distributor cone.

Optionally also a rotary valve can be used for the supply of the different branches to the production lines.

The FR-A-2564374 shows the use of an auxiliary extruder besides a main extruder. The auxiliary extruder has the task to feed recyclate into the main extruder. Here the expert knows that recyclate is always only admissible in small percentages referring to the quantity of fresh plastic in the main extruder. By means of the auxiliary extruder you can dose very well the allowance. A separate melting of the plastic for wood-plastic blends for the solutions of wear problems in the planetary roller extruder is not shown with it.

Also the EP1262294A1 offers no method of solution for wear problems. The brochure describes the production of foam made of wood-plastic blends.

Therefore, due to the above mentioned brochure, it has not been obvious to consult the therein mentioned separate melting of plastic with regard to the solution of the wear problem in planetary roller extruders.

Preferably, the plastic with the additives will be fed into a blend and will be melted and the melt blend will be homogenized. Then the blending with wood is following.

Due to the homogenizing the plastic is distributed evenly onto the wood particles.

For the above process it is favourable, if the melt is low-viscosity. Every thermoplastic plastic has a melting point and above the melting point a point in which the plastic is gaseous und/or enters into a chemical reaction. The point at which the plastic merges into a gaseous condition is depending of the ambient pressure. Thus, the melting temperature can be, depending on the condition of the plastic, e.g. for polyethylene (PE) between 100 and 135 degree Celsius (PE-LD 105-118 degree, PE-MD 120-125 degree, PE-HD 126-130 degree, PE-UHMW 10-135 degree, PE-LLD 126 degree). Under corresponding pressure, the melt temperature can be very much higher (PE-LD 160-260 degree, PE-HD 260-300 degree, PE-HD-UHMW 240-300 degree).

By pressing of the wood particles their cavities will be considerably reduced.

Preferably the cavities/pores in the wood will be reduced min. by 10%, preferable by min. 20% of their original volume. Optionally the wood particles are still further compacted, e.g. reduced to at least 40% of their original volume. This happens by compaction of the wood particles and plant particles respectively. The compaction is scheduled at least at the surface. The compaction at the surface reduces the consumption of plastic which is necessary to create a sufficient compound between the particles and to reduce the moisture absorption and the swelling of the particles to an admissible degree for the respective application.

A similar effect has the observation of appropriate particle sizes.

Preferably chips are used with a particle size smaller 1 mm, still further preferred smaller or equal 0.8 mm. The used chips do not have a particle size range. Preferably the main quantity of the chips have a particle size of 0.3 to 0.4 mm. Main quantity means at least 50%, preferably min. 60% of the chips.

The compacting of wood for the production of blends of weed and plastic itself is already subject of an older proposal. In the older proposal it is intended to pelletize the wood particles before the blending with the plastic. The use of pellets mainly serves for the increase of the wood proportion in the blend, for example to a proportion of more than 80 wght % in the blend. Thereby, the pellets facilitate the feeding of the wood particle into the extruder. the pellets namely are running easily into the feed hopper of the extruder. Moreover, pellets can be dosed easily. In practice, however, the pellets did not prove their worth, as there is the danger that the pellets will not solubilise enough, but decompose later when they will be wetted after profiling of the blend. The danger is by far higher when using the material in the outdoor area when the blend when passing again and again the change of freeze/thaw.

At the pelletizing also a pressing of the wood and a reduction of the cavity of the wood takes place, however, this takes place before the contact with the plastic melt.

Whereas the wood/plastic blend at the procedure according to the invention shows surprisingly good resistance values against freeze/thaw as well as a much lower swelling behaviour, the contrary occurs when using pellets which have been produced before contact with the melt.

As per the invention the processing takes place different from the older proposal without the great pellets and their necessary comminution, but by use of smaller particles in the above limits, which make a comminution dispensable and become still smaller due to the compacting in the extruder respectively. With regard to pellets there is the danger that the pellets will not be comminuted totally and the not comminuted residues get into the product without the plastic attaining between the jointly grouted particles. Then a moisture absorption of the pellet leads to a swelling and to a loss of the particle bond in the pellet residue.

The blending of plastic melt and wood occurs according to the invention under pre-heating of the wood, so that the flowability of the melt will not be essentially reduces by the transfer of heat onto the wood.

The merging (blending) of wood and plastic melt occurs preferably in a planetary roller extruder and in a planetary roller section of an extruder respectively. The planetary roller extruders and planetary roller sections respectively consist of a centrical central spindle, rotating planetary spindles and an internally toothed housing. The planetary spindles and the central spindle also have a toothing. During rotation the toothing of the planetary spindles rotate simultaneously with the toothing of the central spindle and the toothing of the housing.

Thereby the wood particles arriving between the teeth of the planetary spindles will be blended very deeply with the plastic melt and simultaneously pressed.

In principle the pre-heating of the wood particles can only occur in the extruder. Favourable will be a pre-heating of the wood particle before their feeding into the extruder, because conventional devices for the pre-heating only cause a fractional amount of the costs of an extruder.

Preferably the outlet temperature of the blend out of the extruder is chosen in that way, that the coming out profile strand has a sufficient rigidity in order to cool for example on a roller conveyor with rolls arranged closely together without causing disadvantageous deformations. But also higher outlet temperatures can be handled in that way that directly behind the extrusion die a calibration is scheduled. With regard to the dimensions of its opening the calibration corresponds to the required cross section of the extrusion strand. The contact areas of the calibration with the extrusion strand, however, are cooled, so that the extrusion strand hardens at the outer border and thus becoming stability to pass the roller conveyor.

The calibration is very similar to the extrusion die. The extrusion die as well has an opening with a cross section corresponding to the cross section of the desired extrusion strand. The die as well preferably has a cooling. As far as this cooling is sufficient to stabilize the coming out extrusion strand for the roller conveyor, a calibration in the above sense will not be necessary. However, the use of a calibration can be more economically than an extrusion die in special design with especially long cooling section.

Advantageously, especially the extruded profiles at which the wood particles have been blended immediately after entry into the planetary roller section of the extruder with the plastic melt and then have been compacted between the parts of the planetary roller extruder section, have special high stability and an especially high resistance against moisture absorption and an especially high resistance against change of freeze/thaw.

The invention is defined that the melt at the procedure according to the invention is at least partially penetrated into the cavities/pores of the wood before the compaction takes place. In this case the compaction leads at the procedure according to the invention to a further filling-out and to a sealing of the cavities/pores. At the known procedure the compaction of the wood leads only to a narrowing of the cavities/pores so that the viscous melt can no longer or only hardly penetrate into the cavities, however, water and especially vapour can do this. The penetrating moisture is the reason for the swelling. At a change of freeze/thaw the blend has to bear extreme stress. There is the danger that the blend will be broken open due to ice formation and melting of the ice respectively.

Several criteria of the procedure according to the invention are known, however, not in the combination according to the invention.

In this sense the production of blends as per EP 1297933A1 is known as per which at first the plastic will be melted and then blended with wood particles and kneaded. Afterwards the blend shall be supplied to an extruder and pressed to a sheet. Here a typical production of wood chipboards is concerned. At the production of wood chipboards it is necessary to wet the wood particles with adhesive and then to press them. An extrusion of the chips does not occur at the production of wood chipboards. It is typically to stir the chips with the adhesive in a kneader.

At the procedure according to the invention an extrusion is intended. Thereby no additional kneader will become necessary. Wood and plastic are directly supplied into the extruder.

The wood/plastic blend is coming out of the extruder as an "endless" strand. Furthermore, you have not only to consider more effort at the known procedure, the kneading of the liquid melt also leads to a higher plastic proportion.

The EP 1262293A1 contains also a proposal for the blending of wood chips and plastic. The chips shall have a width of 0.5 to 20 mm, a thickness of 0.5 to 2.5 mm and a length of 1 to 500 mm. For wetting of the wood chips a jet of liquid plastic will be created, the wood chips are interspersed into the jet and on a ribbon arranged below a material layer is generated which afterwards will be pressed. The extruder does not come into contact with the wood chips. The extruder is only intended for liquefaction of the plastic. The known proposal does not exceed the before defined known proposal. This is also valid as far as in the proposal the wetting of fibers with plastic is mentioned.

The U.S. Pat. No. 5,653,534 shows a procedure for reinforcement of plastic with fibers. The plastic is brought into melted condition. Then the fibers are fed. The emerging product has essentially the same appearance as plastic without reinforcing inlay. By the procedure according to the invention, however, a wood substitute with the impression of a wood surface shall be created.

Moreover, the processing of a wood/plastic blend with a wood proportion of 60% and more makes incomparable high demands contrary to the processing of a fiber/plastic blend with a fiber proportion of 30%.

At the blend according to the invention of wood with the liquid melt before pressing/compaction the temperature of the blend proportions is of considerable importance. Favourable is a high temperature of the melt. The higher the melt temperature, the higher the flowability of the melt and the better can the melt penetrate into the cavities/pores of the wood before compaction of the wood. The max. melt temperature is depending on the material. With regard to the melt temperature, preferably a safety distance is kept from the temperature at which the melt passes into a gaseous condition or a chemical reaction occurs. The safety distance amounts optionally to min. 5%, still further preferred min. 10% and highly preferred min. 15% from the temperature, at which a passing into the gaseous condition or a chemical reaction occurs.

Moreover, the melt temperature is restricted due to the condition of the wood.

Depending on the condition the wood tends at higher temperature to an undesired discoloring.

There are resulting different processing temperatures for the melt, depending on material and pressure. Whether the processing range can be exhausted completely or partially is depending on the used wood and on the temperature of the wood. At higher temperatures a highly liquid plastic is arising. That means, the plasticization according to the invention contains an intense liquefaction.

Preferably plastic is used which has been max. once recycled. The oftener the material has been recycled the worse the flowability of some plastics will become. Or a plastic is used consisting of a blend of fresh material with recycled material and which has as least the same flowability as a material which has been recycled in totally not more than one time.

Still much more preferred is the use of an overall fresh plastic, non-recycled material.

Optionally the plastic will be plasticised together with the additives or the additives will be blended with the plastic after the plasticization of the plastic before the blending with the wood particles will take place. To these additives belong preferably dyestuffs and bonding agents as well as water repellents.

Wood particles are preferably used in the form of chips, e.g. in the form of wood shavings. Wood shavings accrue in large quantities at the processing of wood. Simultaneously the dimensions of wood shavings are within certain limits. Usually, wood shavings are conveyed by means of pressurized air. By means of the pressurized air the wood particles can be transported within wide limits to any place, e.g. to the feed hopper. Usually, pressurized air accrues by use of blowers which are sucking in the air at the one side and are pressing the air at the other side into a transmission pipeline. At the goal of the wood particle transport the pressurized air must be separated again from the wood particles. This is done by means of suitable filters. In practice, however, the filters cannot separated every dust particle from the pressurise air. Fine dust arrives in a more or less large amount into the surroundings.

In the further formation of the invention the outlet of the fine dust shall be reduced. Therefore suction air is preferably used for the transportation of the wood particles. At the goal of the suction air transport the wood particles are separated from the suction air by means of filters, as done at the pressurized air transport.

Optionally the wood is used in pre-heated condition. The pre-heated wood brings forward the penetration of the melt into the cavities/pores, because when contacting the wood the melt gives off heat only in a smaller range than at room temperature of the wood. Furthermore the pre-heating of the wood can cause a drying.

The plasticization can take place in different devices. Imaginable is a batch-wise liquefaction. For the liquefaction of the plastic a heated pressure vessel is scheduled. When using one single pressure vessel with one single chamber the batch-wise operation allows only one intermittent liquefaction process. With two vessels, however, a continuous liquefaction process can already be brought out. The same applies for one single vessel with two melt chambers, which can be alternately fed and depleted. The depletion of the vessel is preferably executed by means of a pump. The pump does not only care for a quick depletion, the pump can also build up a high pressure in the melt.

Preferably the plasticization of the melt is executed in an extruder. In an extruder the melt temperature can easily be controlled.

As far as a pre-heating of the wood is required, the wood will be heated at the same time at another place. After the heating the wood particles are blended with the plastic, the above described homogenizing and compaction takes place.

The heating of the wood particles can occur single-stage or multistage. The heating occurs before the contact with the plastic. Depending on the temperature of the supplied melt and on the further processing of the melt and the therewith connected temperature control the wood can receive a further heating or a cooling by the supplied melt and the further processing.

The pre-heating of the wood amounts preferably to min. 50 degree Celsius, still more preferred mind. 100 degree Celsius and highly preferred mind. 150 degree Celsius.

Optionally the multi-stage pre-heating of the wood will be effected by different heating equipments. Each heating device can work continuously or discontinuously. A continuously working heating device is for example a heating band and/or tunnel furnace.

The heating band is a heated belt conveyor at which the wood particles are heated. The heating band can also conduct the wood particles under suitable heat radiators. Thereby it is favourable to house the heating band in order to avoid a loss in temperature.

A tunnel furnace has a housing. A tunnel furnace differs from the heating band that not the conveyor belt, but the housing is equipped with a heating device and/or that a heating gas is led through the housing. The heating temperature is chosen in that way that any danger of combustion/fire danger for the wood will be avoided.

A discontinuous heating can occur in a container until the wood particles have reached the requested temperature. Optionally the container a gaseous heating medium is passed through the container. Opportune are inert heating gases. Inert heating gases can be led through the containers with a far higher temperature as e.g. air without the risk of fire danger.

After the requested heating of the wood particles the container can be opened and the wood particles can be discharged out of the container for the blending with the plastic.

When the pre-heating takes place totally or partially in an extruder and an extruder section (module) respectively then the blending of plastic and wood is executed preferably in a downstream further extruder or downstream extruder section. Each extruder/extruder section is equipped with a material feed opening and with an outlet for the compounded material. The material feed opening is located at the end of the extruder. From there the material will be supplied with the requested treatment to the material outlet at the other end of the extruder.

Preferably the wood particles are supplied into the feed opening of the extruder in which the blending with the plastic is intended. The plastic will be plasticised preferably in a separate extruder and injected as melt into that extruder, destined for the blend, as soon as a sufficient pressure build-up in the supplied wood has happened. At simultaneous use of the extruder for the heating of the wood the injection place will be chosen in that way that the heating section will be long enough in order to achieve the requested temperature.

The extruders are known in several types of construction.

There are single-screw extruders, twin-screw extruders and planetary roller extruders.

The single-screw extruder has only one screw surrounded by a housing. The twin-screw extruder has two parallel side-by-side arranged screws which are rotating together. The screw can rotate in the same direction or can rotate in opposite directions. The single-screw extruder as well as the twin-screw extruder normally has multipart screws. Thereby a multitude of bushes are arranged in series in axial direction. The bushes have a toothing outside and inside a through-hole so that they can be tensed up against each other with a tensioning bolt. This kind of construction allows to design the twin-screw extruder via a requested distance as kneader.

The planetary roller extruder has an axially arranged central spindle which will be driven. Around the central spindle there are arranged planetary spindles. The planetary spindles rotate with the central spindle.

The planetary spindles are surrounded by an inner toothed housing.

The planetary spindles rotate with the internal toothing of the housings.

Every rotation of the central spindle effects a rotation of the planetary spindles. Thereby the planetary spindles rotate like planets around the central spindle.

The different types of construction can also appear in combinations. E.g. the primary extruder of a tandem line can be composed of a single-screw extruder or twin-screw extruder whereas the secondary extruder is a planetary roller extruder.

The primary extruder and the secondary extruder can be driven with different speed. This offers considerable advantages.

The combination of different extruder systems can also take place in one single extruder. Thereby the extruder systems, combined with each other, form extruder section in the extruder. As already mentioned at another place the extruders can have different tasks and several tasks can be fulfilled successively in the extruder. These tasks can be named as process steps. On the other hand extruders can consist of sections due to constructive reasons. The constructive extruder section can correspond with the process steps of the extruder, but it is not necessary.

As per the invention the plastic will be liquefied before it will be blendes with the wood. The liquefaction occurs in a separate extruder. At the same time this can be used for the processing of the plastic. Thereby one speaks of the reprocessing of the plastic and the following process steps can occur for example: feed in of the plastic, melting of the plastic, dispersion of additives in the melt and homogenization of the generated melt.

At separate recycling of the plastics in a separate extruder the process sections are for example feeding of the plastic, melting, homogenising/dispersion of the separate melt.

At the processing of wood/wood particles in an extruder the process sections are e.g. the feeding, injection of the melt, blending with the melt, homogenising of the blend, degassing and cooling of the blend to extrusion temperature.

The before mentioned processing steps of the wood/wood particles can also take place in two or several downstream arranged extruders. At two downstream arranged extruders you speak about a tandem line with one primary extruder and one secondary extruder. At several downstream arranged extruders you speak about a cascade line.

The tandem line and the cascade line are outstandingly suitable for the degassing of the blend. Thereby the blend can fall out of the discharge end of the primary extruder into the below arranged feed opening of the secondary extruder.

Between the primary extruder and the secondary extruder there can also be destined a conveyor, e.g. belt conveyor. When using the conveyor, the blend can fall onto the conveyor and can be conveyed horizontally or inclined downwards or on inclined upwards by means of the conveyor.

On the way from the primary extruder into the secondary extruder the degassing can take place. The degassing can take place under ambient pressure. In case the degassing shall be enforced this can take place by use of a vacuum. For this the hauling distance from the primary extruder to the secondary extruder will be surrounded by a housing.

At the tandem line as well as at the cascade line the blend is transferred in a heat into an extrusion product, especially an extrusion profile. The heat excludes a vast cooling, especially a cooling down to ambient temperature. As per the invention the extrusion product with reactive blending components before the reactive blending components can react. Such blending components can be water repellents.

Moreover, the blend has no solidification of the plastic before the entry into the last extruder of the processing distance (e.g. secondary extruder of the tandem line). Otherwise the solidified blend particles would break open in the secondary extruder without securing that the wood of the particles would be secured sufficiently against moisture absorption at the breaking point.

As far as at the production extruders are used which consist of housing sections/modules, these housings will be fixed together in known manner by means of flanges, preferably screwed together.

As far as several housing sections/modules are belonging to the extruder which are designed as single-screw sections/single-screw modules (like a single-screw extruder) and which are arranged downstream, then there is intended a joint screw for the different single-screw sections/single-screw modules. Joint means the screw continues from one single-screw section/single-screw module in the next module. That is a usual technique.

If moreover a planetary roller extruder section/planetary roller extruder module attaches at a single-screw extruder section/single-screw module so it is usual that their screw will continue as central spindle in the planetary roller extruder section/planetary roller extruder module. Such a situation occurs for example in case one or several single-screw extruder sections/single-screw modules are intended for the process step "compounding of the plastic" and in case a planetary roller extruder section/planetary roller extruder module is intended for the range "cooling of the melt to extrusion temperature".

The use of a collective screw for different extruder sections is relatively easy at modern extruders. These screws will be assembled out of bushes which will be penetrated by a collective rod and will be tensioned with each other. This kind of construction also has other advantages.

Often the extruder sections are formed also in the extruder housing.

Thereby the housing sections will be tensioned with flanges at the ends.

In the following it is only spoken about extruders. This includes the combination with same or other extruders as well as the combination in sections of different extruder systems in one extruder. Furthermore, the combination of extruder sections of the same system is included as well.

All modern extruders are equipped with a heating-cooling device.

For this the extruders are equipped internally with a liner. The line has outside channels which are incorporated into the outer area of the liner like grooves or threads or screw flights. The outside arranged channels can relatively easy by cut by turning and milling.

The thus treated channels are inserted into the internally smooth borings of the housing. Through the channels are pressed cooling mediums or heating mediums optionally in direction of the melt flow or contrary to the direction of the melt flow. Optionally any heating or cooling distances can be created. Due to the coiling of the channels the heating or cooling medium is led controlled for a long time along the wall of the housing and the outer wall of the liner respectively. this secures an extreme cooling or heating.

Whether a heating distance or a cooling distance is concerned is resulting from the respective procedure. Thereby, heat must be added or abstracted from the passing through medium.

Theoretically the channels could also be arranged at the internal area of the housing and the outside of the liners could be smooth.

The incorporation of the channels at the internal side of the housing is much more laborious than the before described incorporation into the outside of the liner.

Moreover, it is of advantage to assemble the liners by shrinkage in the extruder housing. This happens by heating of the extruder housing. Due to the heating the extruder housing is enlarged. During this condition the cold liner will be slid into the bearing bore of the extruder housing. During the following cooling down the extruder housing is contracted and surrounds the liner closely if the liner has a corresponding external dimension and the boring of the housing has a corresponding inside dimension. Such a situation occurs when using a so called interference fit. At the interference fit the liner has outside at least exactly the same diameter or an insignificant larger diameter as the extruder housing inside.

The known interference fits are designed in that way that after the shrinkage a separation of the liner from the extruder housing will be possible by means of heating of the housing without any damage of the parts. The separation is important in order to rework, if necessary, the toothing of the liner or to exchange the old liner against a new one.

For the compounding according to the invention of a plastic/wood blend there is preferably scheduled one extruder consisting of different sections of different kind of construction, namely preferably of one single-screw module/section and one or several other planetary roller modules.

Thereby it is of advantage when the single-screw module is designed in such a length and heated that the filled-in wood has reached the requested temperature when leaving the single-screw module. Advantageously the single-screw module simultaneously causes a pressure build-up in the wood, which avoids an escape of the injected plastic melt in direction of the feed opening for the wood.

It is also of advantage when the plasticised plastic between the single-screw module and the further for the blend of plastic and wood scheduled extruder modules is supplied via a stop ring or via an intermediate ring.

To each module and section respectively belongs a surrounding, normally tubular housing. This is valid for modules and sections respectively of every kind of construction. The houses are in any case at each end equipped with a collar (flange). At this collar the fastening takes place with the housings of neighbouring modules and section respectively and if necessary with the housing of the gear normally scheduled for an extruder. The gear belongs to the drive of the extruder.

Between two housings an intermediate ring can be of advantage.

The intermediate ring can fulfill different tasks. It can fulfill individual tasks or several tasks at the same time.

The tasks are for example
a) the centring of the correspondent ends of the housings and/or
b) the insert of process agents and/or
c) the measurement of process parameters and/or
d) the degassing and/or
e) the elongation of the planetary roller part The elongation can occur thereby that the housings will only be spaced.

Thereby the intermediate ring can have different forms. In one form the intermediate ring forms a distance piece which is located between the ends of the housing. In another form the intermediate ring has the form of a bush.

Thereby the intermediate ring can encircle the central spindle in a distance. In case the housing of the corresponding planetary roller parts has conventional stop rings then a cavity occurs between the central spindle and the intermediate ring.

Optionally the cavity is chosen in such a size that the planetary spindles can extend through the cavity and can rotate in the cavity.

Optionally, the intermediate ring has also inside the same toothing like the housings of the planetary roller part. Then the planetary spindles extending through the cavity of the intermediate ring can rotate at the same time with the internal toothing of the intermediate ring.

Due to the elongation of the planetary roller parts unusual lengths can occur.

According to the invention also planetary spindles with conventional lengths can be used. This occurs thereby that the planetary spindles are aligned lengthwise and then arranged to one another. The planetary spindles can in that position rotate without problems around the central spindle. They are kept in the position by the tooth depth with the central spindle and by the tooth depth with the inner toothed housing.

That means that the spindles, lengthwise aligned and arranged to one another, conduct themselves like one single oversized planetary spindle.

As far as the planetary spindles, jointly forming an oversized planetary spindle, do not form a suitable length, preferably one of the respective planetary spindles will be cut to a suitable length. It is of advantage when this takes place before the heat treatment of the planetary spindles by which the planetary spindles can be made wear-resistant.

The planetary spindles can be treated easier with conventional aids before the hardening or heat treatment of the surface of the planetary spindles.

By the assembly of the planetary spindles according to the invention the risks of an arising warpage, occurring normally due to a heat treatment, will be minimized. The warpage occurring at a heat treatment, is depending on the length. Depending on the form and the material of the planetary spindles more or less warpage can occur.

Optionally the parts, destined for an oversized planetary spindle, can be connected at the front surfaces at which they contact each other. Thereby can the one part with a journal seize into an opening of the other part.

The intermediate ring, intended for the supply of the liquid plastic melt, can have different forms.

A pipe section can be concerned which is, except its minor axial length, comparable to the housing of the single-screw module and section respectively. It also has at the ends collars by means of which the fastening of the intermediate ring at the housings of the neighbouring extruder modules and sections respectively is executed.

The intermediate ring is penetrated by the extruder screw/spindle. In the range of the single-screw module and single-screw section respectively, the extruder screw/spindle is a single-screw, in the range of planetary roller modules a central spindle.

Normally the extruder screw/spindle is designed in several parts. All parts have a bush form with a toothing at the outside. The centre hole is penetrated by an anchor which has the task to tension all bushes with each other.

In the single-screw module the extruder screw/spindle is composed of a multitude of parts/bushes having a different toothing at the outside in order to exert influence by means of the design of the screw flights on the compacting and treatment respectively of the feedstock in the single-screw module.

In the planetary roller module normally there is intended a single-piece bush forming the central spindle and which is kept with the same anchor which keeps the bushes of the single-screw module.

The anchor is running also through the above describes intermediate ring for the injection. In the intermediate ring there is also intended a bush on the anchor. The bush can have outside the same or another toothing like the single-screw at its end.

Optionally the intermediate ring is equipped in the same way like the extruder modules/sections with a heating-cooling device which, according to requirements, allows a cooling or a heating.

The intermediate ring can also be assembled without collar. Then the intermediate ring is inserted between the collars of the neighbouring houses, i.e. between the housing of the single-screw module and the housing of the planetary roller module. Afterwards, the two respective collars are tensioned against each other by means of tensioning screws or other tensioning means.

It is favourable when an intermediate ring gears into a centring opening of the neighbouring housings and collars respectively or vice versa the neighbouring houses gear into a centring opening of the intermediate ring. A centring opening can be made by a hollow at the front area of the intermediate ring and the neighbouring housings respectively. Thereby a small hollow may be sufficient. A corresponding nose at the opposing front area corresponds to the hollow.

For the supply of the liquid melt there are scheduled in the intermediate ring preferably several inlet borings which are evenly distributed on the circumference. Several cables may go to the different inlet borings. But there can also be a connection of the inlet boring by a circular groove in the intermediate ring which is closed by means of the cover and which is fed with liquid melt via a joint supply line.

The supply lines connect the extruder, intended for the liquefaction of the plastic, with the intermediate ring. It is advantageously to isolate and to heat the supply lines so that no unwanted decrease of temperature in the melt occurs or the melt even freezes.

Optionally there are scheduled valves or gates for adjustment of the melt flow in the different supply lines to the intermediate ring. The valves allow optionally an adjustment and influence on the melt flow during operation. This can be used for a smoothing out for the creation of differences. Additionally or instead of the valves an alteration of the melt flow can be reached by inserts which will be located in the supply lines. The inserts can also be scheduled in the intermediate ring.

Incidentally, the melt flow is determined by the speed of the extruder which is intended for the plasticization of the plastic.

Optionally the liquid melt can also fed into the single-screw module/section at the end of the heating distance. Then the extruder, destined for the creation of the liquid melt, is connected directly to the single-screw module/section, intended for the heating of the wood.

The connection is optionally executed thereby that the extruder, destined for the liquefaction, is flanged directly to the housing of the single-screw module/section, or e supply line is intended which leads to the housing of the single-screw module/section.

The extruder directly flanged to the single-screw module and which served for the production of liquid melt can also be described as side arm extruder. This extruder can be of the same kind of construction like the single-screw module, but also an extruder of a different kind of construction can be used.

The housing of the single-screw module/section must be bored through for the supply of the liquid melt. The double-walled housing shell, necessary for the heating-cooling, will be bored through for this. In order to avoid on the one hand the flowing of the melt into the hollow shell and the heating-cooling medium on the other hand does not pollutes the melt there can be mounted a flange which extends with a collar into the boring and thus closes the hollow shell again.

For the supply of the liquid melt also the neighbouring planetary roller module can be tapped. Also there is a housing twin-shell, which will be opened by the boring and must be closed again.

As per the DE 10356423 this will be reached by means of a liner thereby, that the boring is fed through the housing and is extended into the liner which is located in the liner, whereas the material supply with a supply housing extends into the boring and aa) whereas the boring shows a circular expansion in the range of the channels serving for the heating-cooling, so that around the supply housing there occurs a circular connection channel for the channels serving for the heating-cooling or bb) whereas the boring extends into a groove which reaches over the whole circumference or over a part of the circumference of the liner being located in the housing and the width of which is larger than the diameter of the supply housing so that around the supply housing a connection channel occurs for the channels serving for the heating-cooling or cc) whereas a supply housing is used which extends into the liner, whereas the supply housing is equipped in the range of the channels serving for the heating-cooling with at least one connection channel for these channels.

Advantageously the connection channel as per cc) can be incorporated outside into the supply housing by cutting and milling.

Preferably there is intended a supply housing with several connection channels so that any interruption of a channel, occurred by the boring, is abolished or bridged by a connection channel.

Much more preferred is a supply housing with several connection channels lying upon another. The single connection channels can be incorporated into the supply housing as adjoining grooves. The channels can lie outside at the supply housing.

Thereby it is of advantage when the connection channels lying upon another have a height which is smaller than the width. At the same time the width has been chosen in such a dimension that the connection channels have a sufficient diameter for an undisturbed transfer of the heating-cooling medium, preferably the diameter is equal. It will be of advantage when the height of the connection channels is chosen in that way that the total height of the connection channels, lying upon another and being separated from each other by a land, is not higher than the height and depth respectively of the channels in the liner serving for the heating-cooling. The channels for the heating-cooling medium must be diverted and sealed in the passage of the material supply in order to avoid a leakage of the heating-cooling medium. By redirection there can occur channels lying upon another as per proposal DE10356423. Furthermore, the sealing takes place by a tube shell of the housing for the material supply (feed housing). The exterior tube shell in then equipped with inlet openings and outlet openings. Each inlet opening is arranged in that way that it is lying at the respective end of the channel occurred by the described interruption. Optionally the connection channels have been incorporated also at the inner side of the supply housing and the connection channels are closed by an inner lying tube shell. Due to the inlet openings and outlet opening incorporated outside into the supply housing there occur also connection channels.

or dd) whereas the boring is enlarged opposite the supply housing and whereas there is intended in the housing an insert with an opening or a connection for the support of the supply housing. The insert has outside or inside one or several connection channels which will be designed or fabricated respectively like the connection channels under cc).

ee) whereas there is an insert in the boring at which the supply housing is fixed and the insert is equipped outside or inside with one or several connection channels which are designed or fabricated respectively like the connection channel under cc).

The above described supply housing can extend the liner, located in the extruder housing, so far that it will end totally or partially with the inner surface of the liner. Is the supply housing adjusted to the inner surface of the liner, it can end totally with the inner surface of the liner. This can also be applied to inter toothed liners of an extruder housing. The adjustment by cutting or milling or grinding or by the adjustment to inner toothed housing liners will be achieved thereby that a toothing will be incorporating into the housing wall in the same way like the internal toothing of the liner being situated in the extruder housing. Opportune is thereby the use of the spark-erosion for the toothing.

For the melting of plastic according to the invention before the merging with the wood particles also a planetary roller extruder module can be used instead of a single-screw module.

Each of these extruders has a housing which can form the above describes housing for the material supply (feed housing).

The side arm extruder can have several types of construction.

There are single-screw extruders, twin-screw extruders and planetary roller extruders.

The single-screw extruder is the cheapest construction of an extruder, but also the extruder with the smallest construction method.

When using a single-screw extruder the inclination of the screw shall cause the requested conveying effect.

The twin-screw extruder has two parallel arranged screws rotating with each other. The twin-screw extruder is indeed more complex than the single-screw extruder. The twin-screw extruder, however, has a by far higher conveying effect than a single-screw extruder. Nevertheless the twin-screw extruder is still relatively favourable. Moreover, the dimensions of the twin-screw extruder are still very small. When using the twin-screw extruder it can be easily ensured that the liquid melt will be injected with the correct pressure into the planetary roller module, due to the high conveying effect.

Optionally, a planetary roller part is used for this side arm extruder. During operation also this planetary roller part can be operated in that way that the necessary pressure for the injection of the liquid melt occurs.

The drawing shows different examples of design of the invention.

FIG. 1 shows FIG. 1 shows an extruder for the production of blends of plastic and wood particles. The extruder has four sections. The extruder sections are designed as planetary roller extruder sections, the fourth extruder section is designed as single-screw extruder and serves for the material feed.

Thereby the housings of the planetary roller extruder sections are marked with 5 and the housing of the single-screw extruder section is marked with 1. Each housing 5 has welded flanges 6 and 7, which are screwed to each other in not demonstrated form. The housing 1 is equipped with flanges 3 and 4 which serve as fastening like the flanges 6 and 7.

Each housing 1 and 5 is internally lined with liners.

Furthermore, at the inner side of the housing are shown channels which can be charged with heating agents or cooling agents if necessary.

The shown ends of the housings 5 are equipped with a clearance for a centring ring 111 and stop ring and wear ring 8.

The stop ring and wear ring 8 form the slide face for the planetary spindles 10. The stop ring and wear ring 8 have an internal diameter being smaller than the marked rolling radius of the planetary spindles 10.

All extruder sections have a joint spindle. This joint spindle is marked with 9 in the range of the planetary roller extruder sections and is marked with 19 in the range of the single-screw extruder sections which serve as feeder.

In the design example the feedstock is formed by wood chips. The wood chips are dosed via a hopper through an opening 2. The wood chips are drawn off in not demonstrated form out of a silo by means of a vacuum conveyor tube and led to a filter arranged above the hopper and separated from the suction air. By means of a not demonstrated stuffing screw the wood chips are drawn off out of the filter into the hopper. In the hopper there takes place a volumetric measurement of the quantity of the wood chips. In other design examples there is intended an additional gravimetric measurement or only a gravimetric measurement. The vacuum conveyor tube is controlled by means of the measurement results.

The first extruder section forms a feeder for the second extruder section. In the second extruder section there takes place the dosing and blending with liquid plastic melt and a compacting; in the third extruder section there takes place a homogenization of the blend. In the last extruder section there takes place a cooling-down of the blend to outlet temperature. In the design example the wood has a proportion of 70 wght % and the plastic a proportion of 30 wght % of the blend. In other design examples the wood proportion amount e.g. to 65% or 75% of the blend. Thereby the charges like colour and water repellents are calculative added to the plastic proportion.

The thus composed blend enters at the extruder tip 12 into a not demonstrated extrusion die the opening of which is replicated to a floorboard so that due to the extrusion of the blend an endless strand with the cross section of a floorboard is created. Floorboards with the appearance of a timber floor board are arising from the not demonstrated cutting of length of the extrusion strand.

The floorboards are profiled at the bottom side. The profiles are chosen in that way that there is a wall thickness of 10 mm. In other design examples a wall thickness of 8 to 12 mm has been chosen.

The profiling includes a cavity formation and chamber formation respectively.

Figure 2:
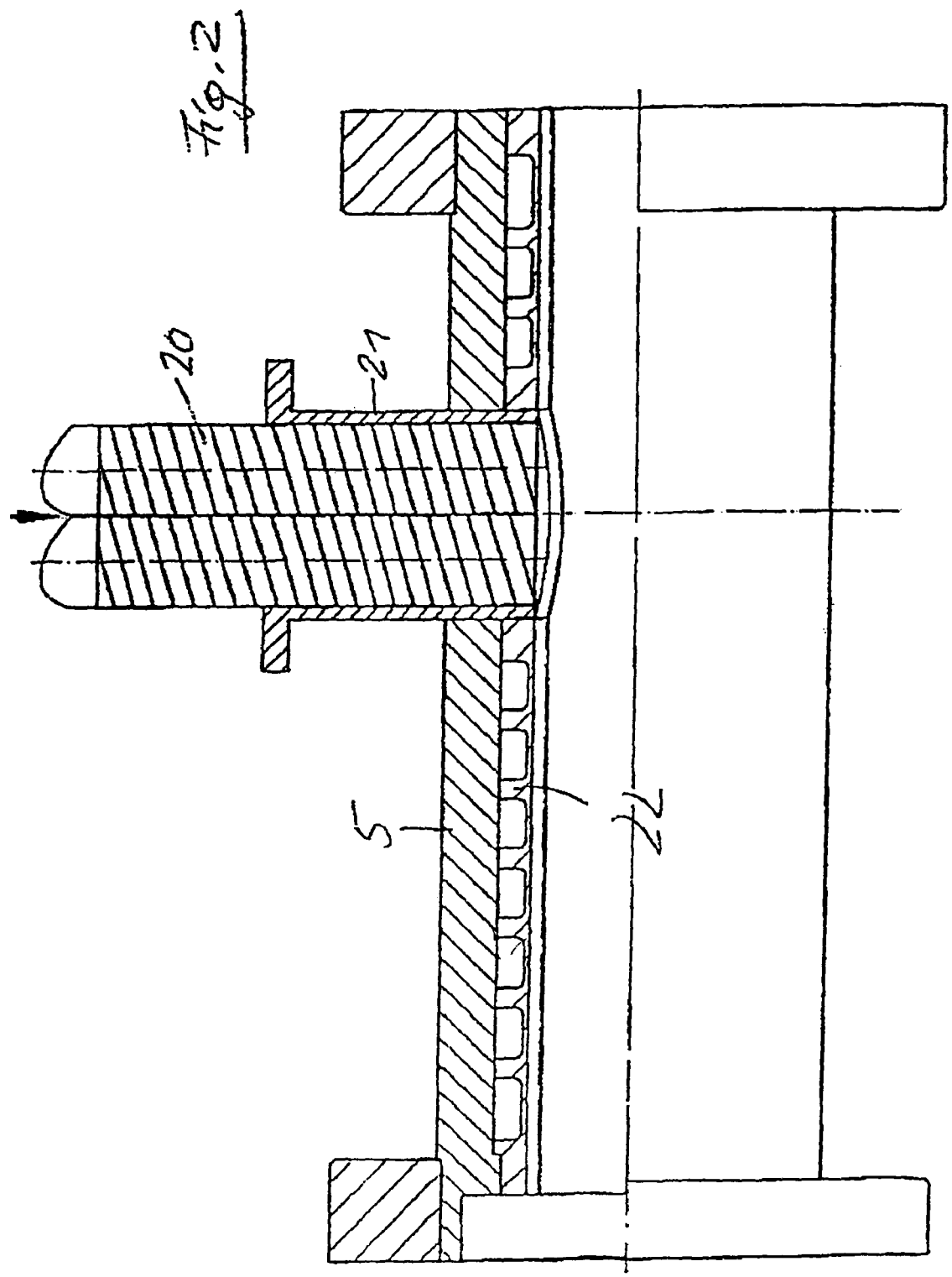
FIG. 2 is a partial cross-sectional view of the exemplary extruder of FIG. 1.

In FIG. 2 there is intended a side arm extruder 20 at the planetary roller part 5 for the feed of the liquid melt.

The side arm extruder is designed as twin-screw extruder. The twin-screw extruder consists of two counter-rotating screws. In the side arm extruder 20 are in not demonstrated form plastic pellets, in the design example polyethylene (PE) pellets, filled in, compressed and heated so that liquid melt is generated from the pellets. Together with the PE pellets additives like colour and water repellents are added at the same time. In the melt the additives are distributed advantageously.

By means of the twin-screw extruder the liquid melt can be injected with considerable pressure into the planetary roller part 5. The liquid melt wets the wood particles at the surface and penetrated into the cavities/pores. During the following compacting of the wood particles the cavities/pores are reduced and closed by the melt, which still remained open during the injection of the melt. The melt is supplied at such a temperature at which the melt remains still liquid even it had released heat when contacting the wood particles.

Between the different wood particles the melt takes effect like an adhesive.

The housing of the side arm extruder 20 is multipart. The header 21 as supply housing is located in a boring of the housing of the planetary roller part 5. The boring extends at the same time the respective liner 22 and ends with the inner surface of the liner 22.

In the design example the side arm extruder is suited for the creation of very high feed pressures.

Figure 4:
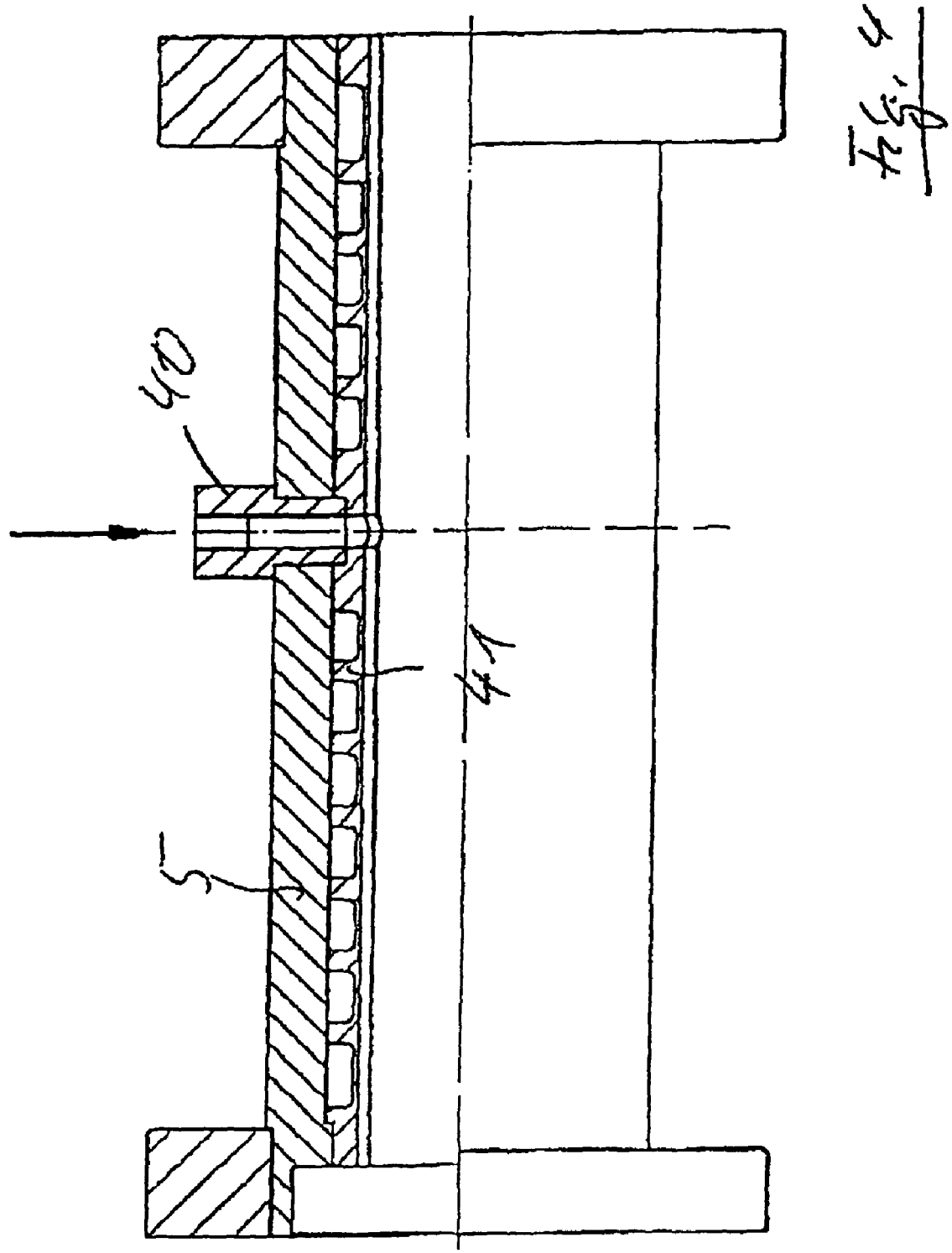
FIG. 4 is yet another partial cross-sectional view of the exemplary extruder of FIG. 1.

In the design example of FIG. 1 the planetary roller part 5 shown in FIG. 4 is used directly after the material feed and directly after the feed part respectively. In another design example the planetary roller part 5 with the side arm extruder is used after the second planetary roller part as third planetary roller part.

In further design examples every planetary roller part can be equipped with a side arm extruder for the supply of liquid melt.

Figure 3:
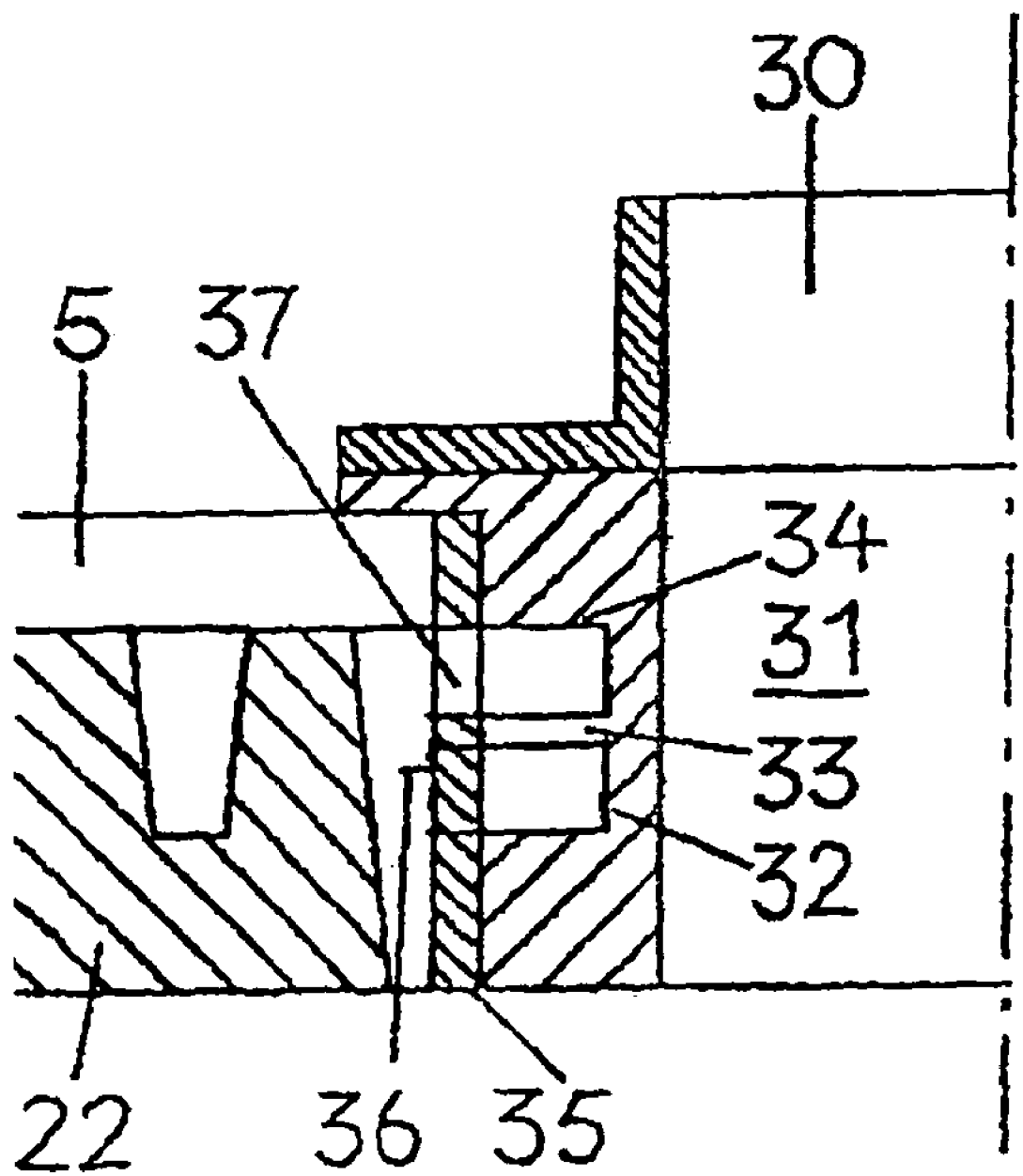
FIG. 3 is another partial cross-sectional view of the exemplary extruder of FIG. 1.

In a further design example as per FIG. 3 the extruder housing marked 30 of the side arm extruder comes up to the housing 30 of the planetary roller part 5. The extruder housing 30 is connected with an insert 31 which is located in a boring of the housing 5. The insert 31 has at its outside two grooves 32 and 34 lying upon another. Between the two grooves 32 and 34 there is a land 33. These grooves form connection channels. Two connection channels are intended because the housing is lined with a liner 22 and because the liner 22 is equipped inside and outside with a toothing. The not demonstrated internal toothing serves for rotating with the rotating planetary spindles which are demonstrated in FIG. 1. The outer toothing of the liner 22 is interrupted at two places for the respective boring for the insert 31. Each connection channel is destined for one interruption and connects the one interruption end with the other interruption end.

The grooves 32 and 34 are closed by an outside tube shell 35 so that no heating agent or cooling agent can enter or leave wrongly.

In the design example there is demonstrated an inlet opening 37 of the groove 34. the inlet opening of the groove 32 is located at another, not demonstrated place.

The outlet opening is located in the design example on the diametrical opposite side of the insert 31 which is not demonstrated.

The design example as per FIG. 4 shows the use of an extruder for the foam production. Thereby a liquid blowing agent is pumped into the plastic melt via an insert 40 which is located in the extruder housing 5.

In the range of the liner 41 there is intended a not demonstrated insert which differs from the insert as per FIG. 3 thereby that only one connection channel is intended.

Figure 5:
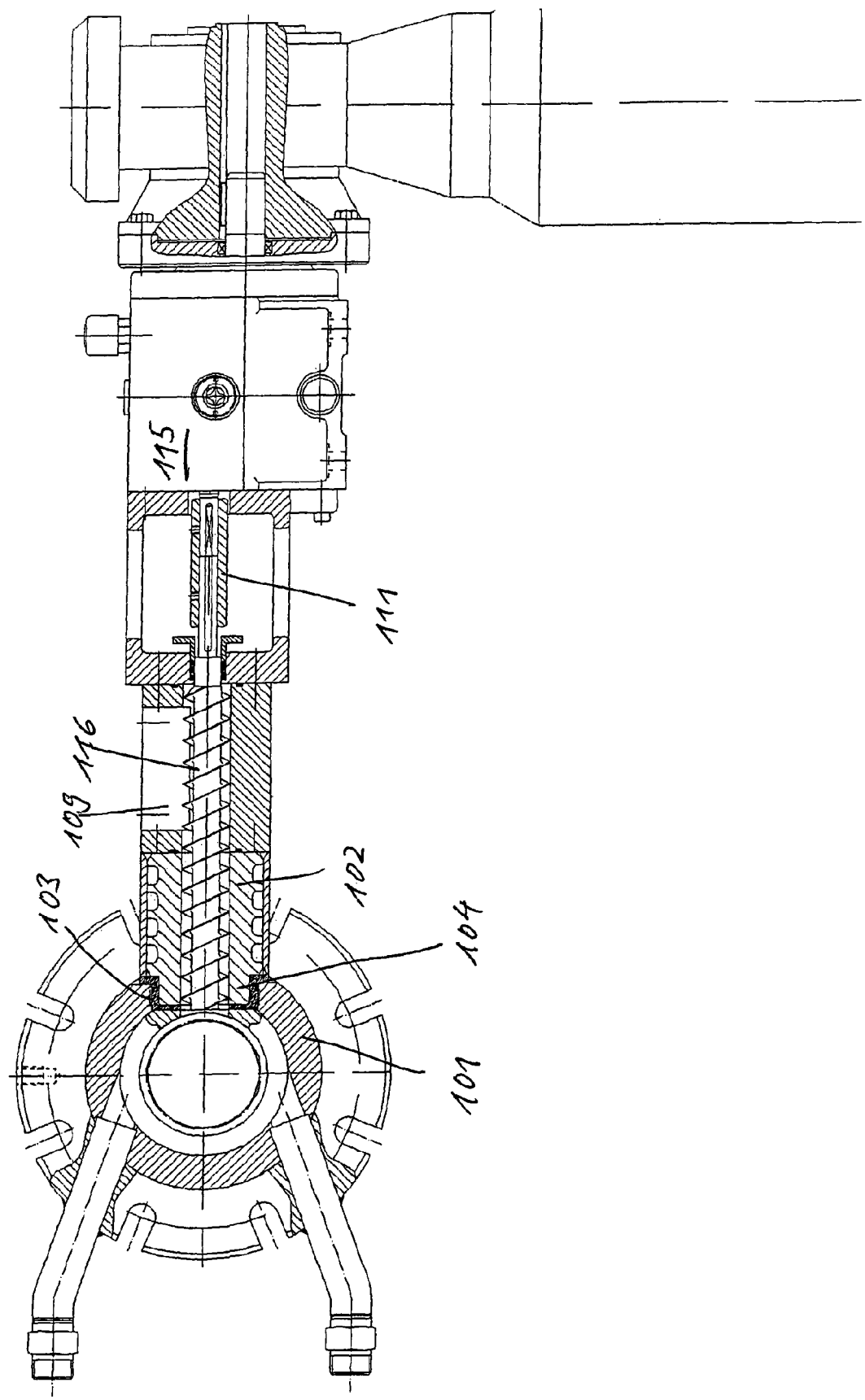
FIG. 5 is a partial cross-sectional view of another exemplary extruder in accordance with the present invention.
Figure 6:
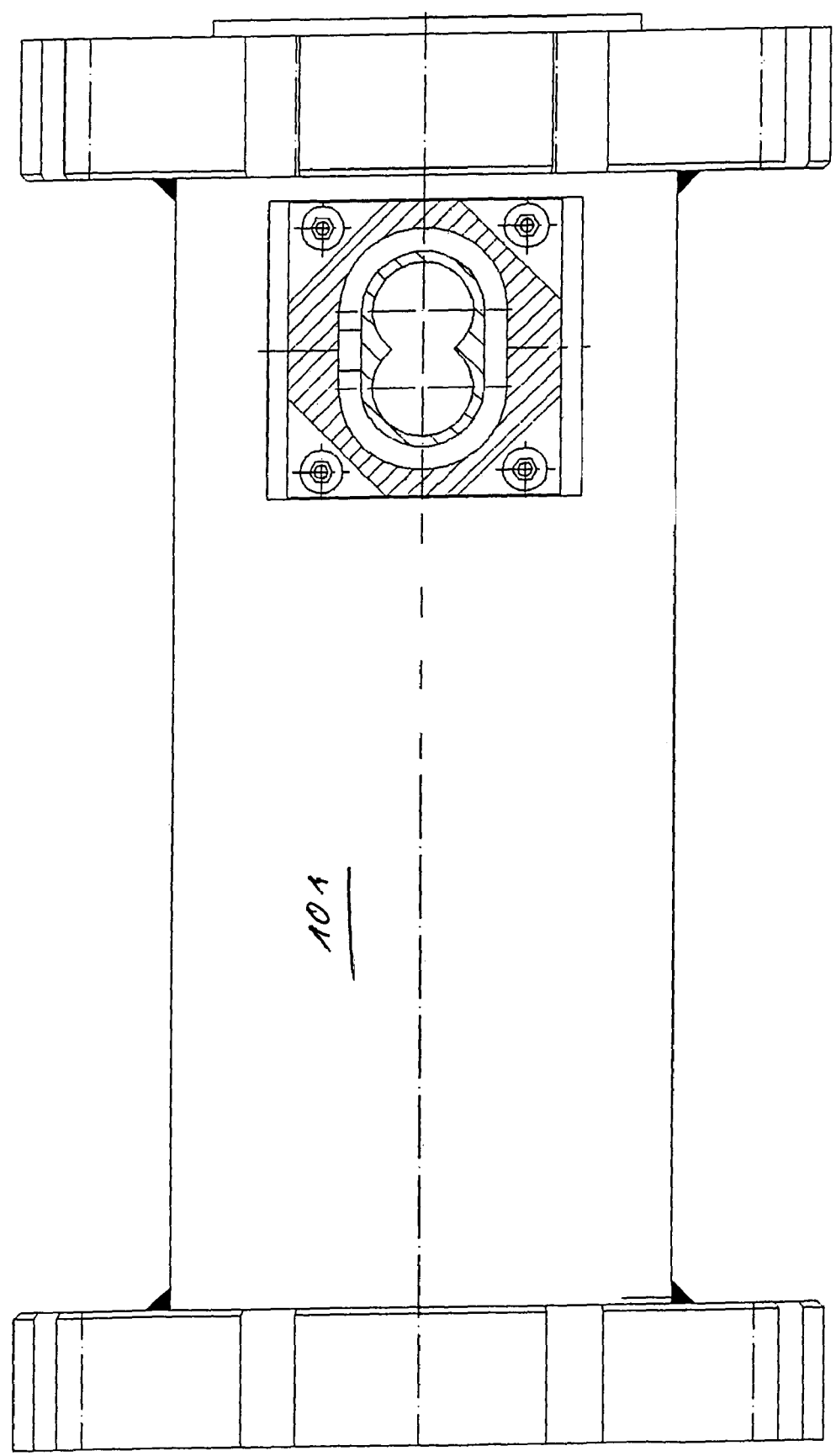
FIG. 6 is another view of the exemplary extruder of FIG. 5.

The FIG. 5 to 7 shows a further extruder with a planetary roller module with a housing 101 and a flanged side arm extruder.

The planetary roller module has an extruder housing with a liner arranged therein. The housing is shrinked on the liner.

Outside the liner has milled in channels for the heating-cooling agents for cooling or heating. The channels are running in form of spirals at the outside area of the liner and occurred by milling. In the design example there are intended two different heating-cooling areas. The one area is marked by inlets and outlets 120, 121, the other area by inlets and outlets 122, 123.

The side arm extruder is a twin-screw extruder and consists of different part. Two parallel arranged screws 116 are belonging thereto which are rotating together and are driven via a motor. Between motor and screws 116 there a scheduled a gear and a coupling 11 with a housing 115.

Furthermore the side arm extruder is assembled of a feed part 109 and an extrusion part 102. The feed part 109 has an opening for a not demonstrated material supply.

In the extrusion part 102 the side arm extruder has a heated-cooled housing.

The housing has a staged end 104 with which it is located in a boring 103 which is extending through the housing of the planetary roller part 101 and the respective liner to the internal space of the planetary roller module. In the range of inlets and outlets 122, 123 the boring requires a special guiding for the channels at the outside of the liner which are intended for the heating-cooling agent. There the channels are led around the range of the boring so that also the surrounding of the boring will be heated-cooled.

An additional possibility for the heating-cooling arises in the surrounding by the heated-cooled front end of the side arm extruder.

The boring goes through the above described stepping to a contact area 102 at the housing.

Figure 8:
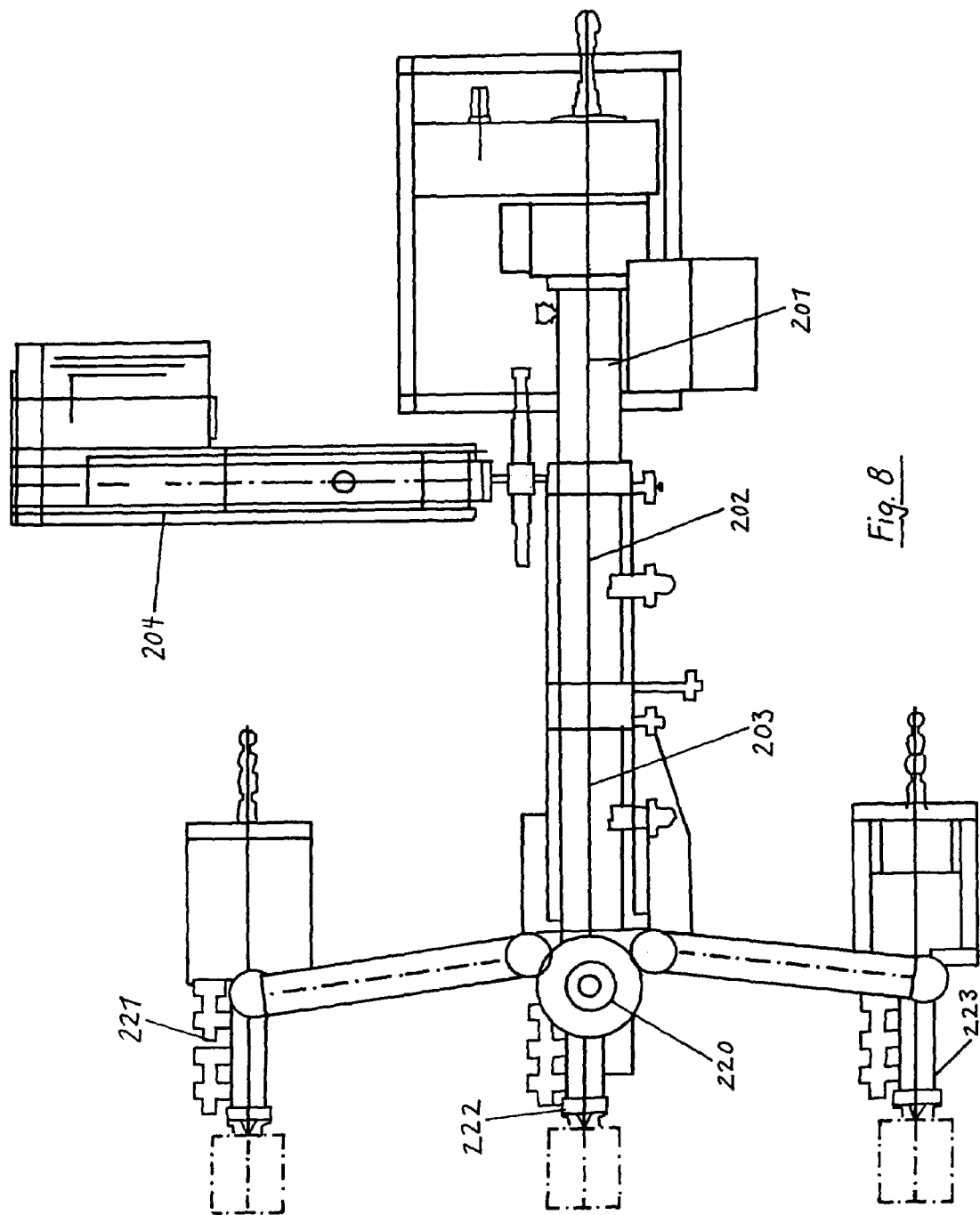
FIG. 8 is a view of an exemplary line for the production of blends of wood particles and plastic in accordance with the present invention.
Figure 9:
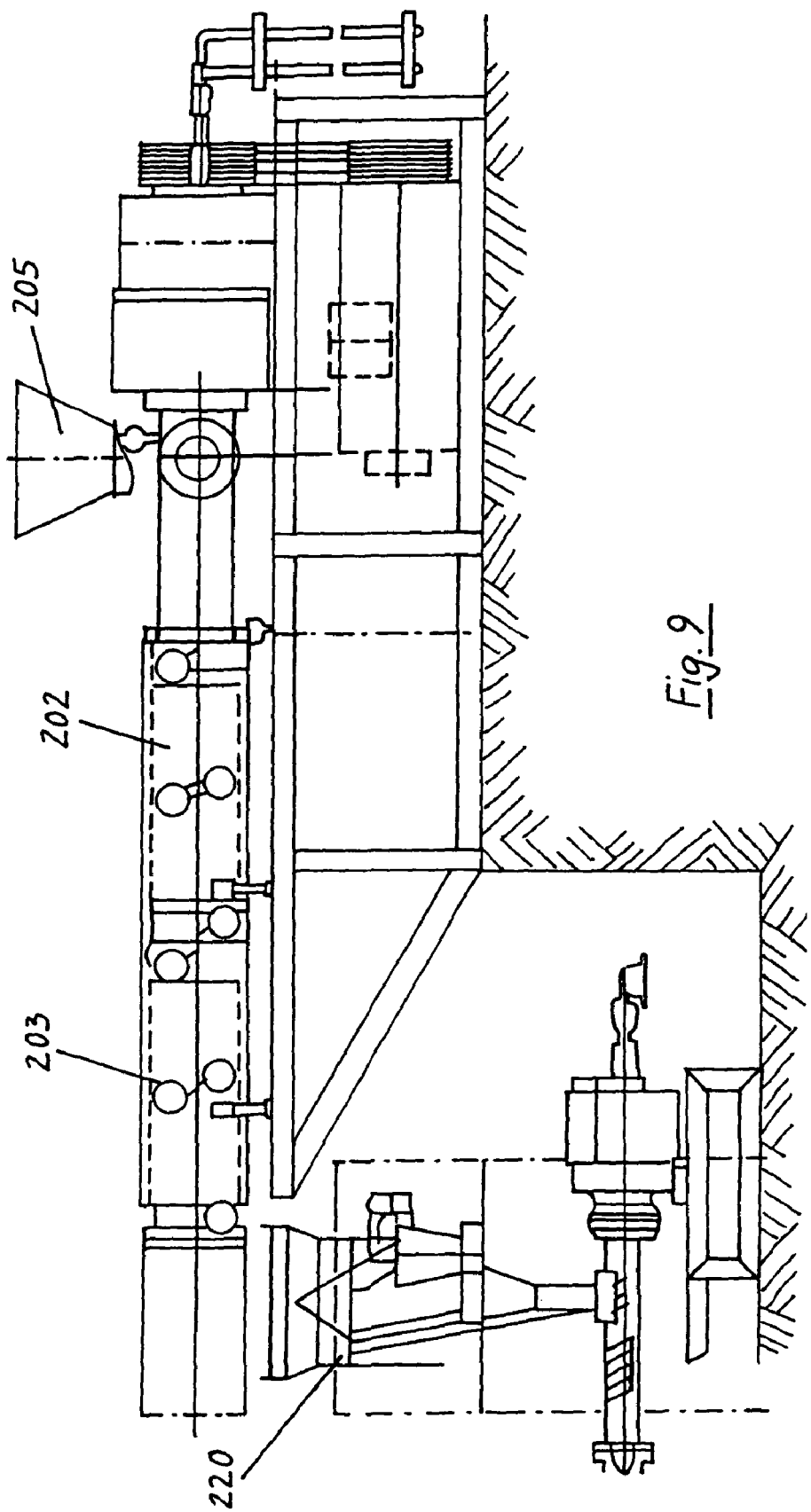
FIG. 9 is another view of the exemplary line for the production of blends of wood particles and plastic of FIG. 8.
Figure 10:
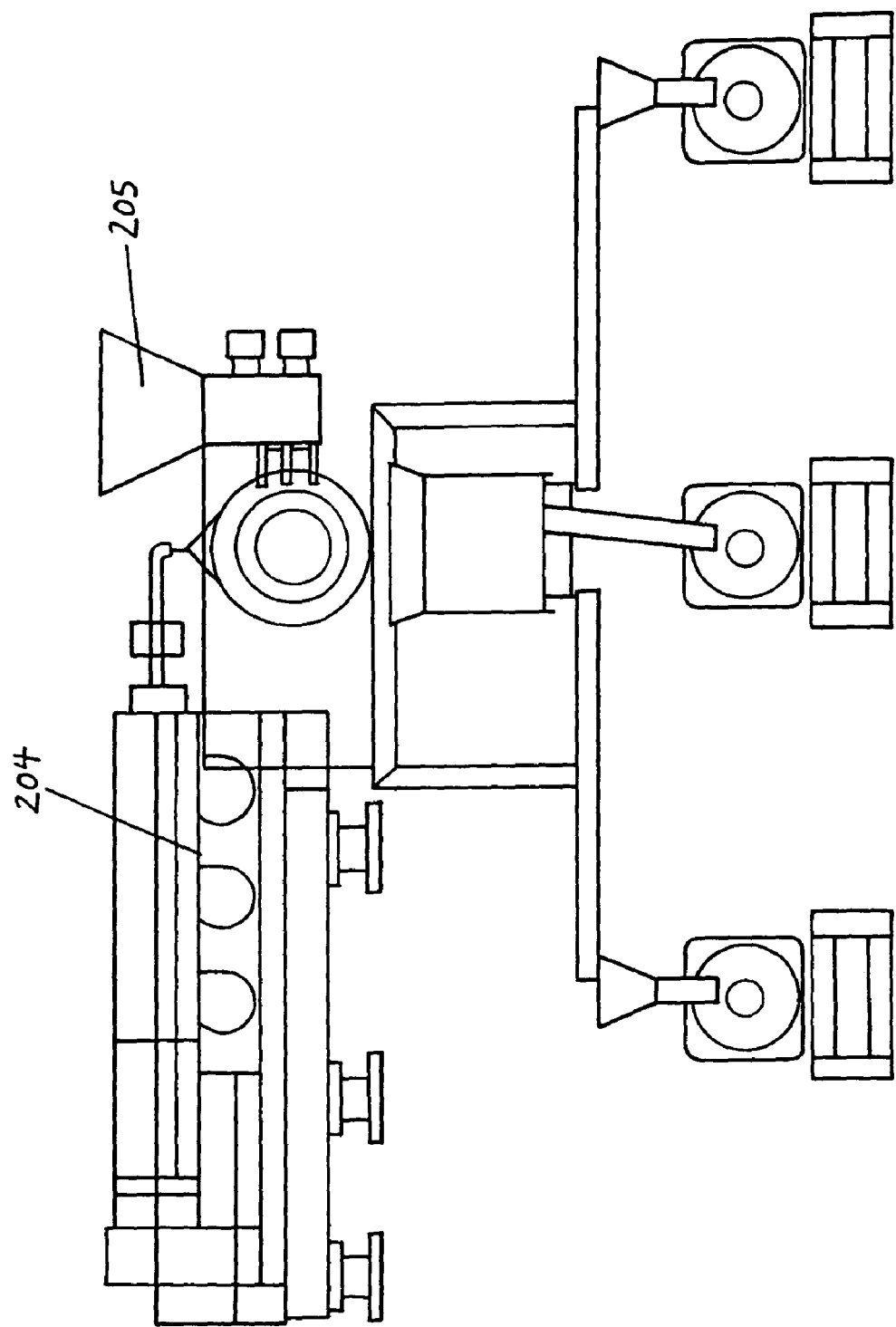
FIG. 10 is yet another view of the exemplary line for the production of blends of wood particles and plastic of FIG. 8.

In a further design example the FIG. 8 to 10 show a complete line for the production of blends of wood particles and plastic.

Thereby an extruder with one feed part 201 and two planetary roller parts 202 and 203 is used. The feed part 201 has the design of a single-screw and corresponds in principle to the singe-screw part and feed part respectively of the FIG. 1. The two planetary roller parts 202 and 203 correspond in principle to the planetary roller parts 5 and 10 of the FIG. 1.

The feed part 201 is fed with wood chips out of a hopper 205. The wood particles are drawn in into the feed part and slightly pre-heated.

To the line belongs also a laterally arranged extruder 204. The laterally arranged extruder 204 is a single-screw extruder and serves for the melting of the plastic. The laterally arranged extruder injects the liquid melt into the extruder between the feed part 201 and the planetary roller part 202.

Figure 11:
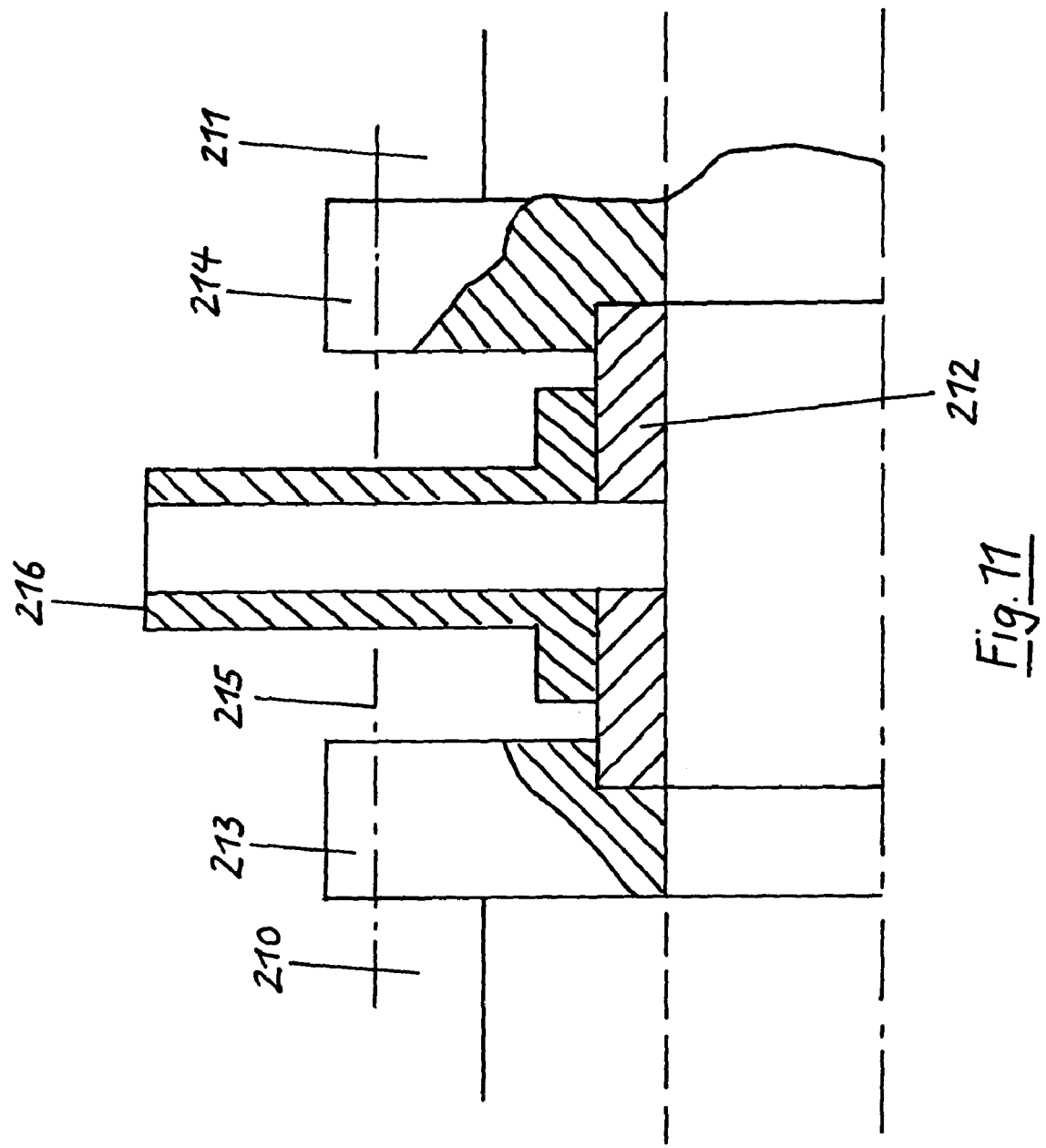
FIG. 11 is a cross-sectional view of an intermediate ring for the exemplary line for the production of blends of wood particles and plastic of FIG. 8.

An intermediate ring is intended between the feed part 201 and the planetary roller part 202. The intermediate ring is demonstrated in FIG. 11. In FIG. 11 the housings of the feed part 201 is marked with 211 and the housing of the planetary roller part 202 is marked with 210. The two opposite housing ends are equipped with a collar 214 and 213. Between the two collars there is inserted an intermediate ring 212. The intermediate ring 212 is inserted in eccentric openings at the front surface of the collars. The intermediate ring 212 has several openings, evenly spread on the circumference, to which lead melt lines 216 from the extruder 204. The intermediate ring 212 is tensioned between the collars 211 and 213. The pre-tensioning is effected by means of tensioning screws of which only a midline 215 is demonstrated. The tensioning screws extend both collars and are working together with the screw nuts.

After the conjuncture of the liquid melt and the wood particles the blending and homogenization and a compacting take place in the planetary roller part 202. In the subsequent planetary roller part a cooling down to the requested outlet temperature takes place. In the design example the temperature of the blend is still so high that the blend is evaporating and loses unwanted moisture on the way.

After the outlet and the evaporation a distribution of the blend to several further extruders takes place in the design example. For this a distribution device 220 is scheduled. The distribution device 220 leads the blend to the downstream single-screw extruders 221, 222 and 223. The blend can be supplied evenly or differentially to one or several of these single-screw extruders, or to all together. The aim is to extrude as and when required different or the same profile formats by means of the singe-screw extruders 221, 222 and 223.

In the design example the distribution device is created by a switch in the hauling distance of the blend after having left the extruder. By means of the switch the conveyed quantity of blend can be diverted to special singe-screw extruders or can be divided into two or three flows which are led then to the respective singe-screw extruders.

The invention claimed is:

1. A method for producing a blend of wood particles and plastic particles in an extrusion line that includes a feed part (201), a side arm extruder (204), and at least one planetary roller part (202) that has a central spindle, multiple planetary spindles, and a surrounding housing, with the multiple planetary spindles rotating about the central spindle in the housing as a result of an internal toothing of the housing, said method comprising the steps of:
    feeding the wood particles into the feed part (201), a majority of the wood particles having a size of between 0.3 and 0.4 mm and the wood particles having a maximum size of 0.8 mm;
    feeding the plastic particles into the side arm extruder (204) and then, independently of the wood particles, liquefying the plastic particles into a plastic melt;
    advancing the wood particles out of the feed part (201) and into the planetary roller part (202);
    injecting the plastic melt into the planetary roller part (202) with the wood particles, such that the wood particles have a proportion of at least 60% by weight in the blend;
    blending and homogenizing the plastic melt with the wood particles in the planetary roller part (202);
    compacting the blend in the planetary roller part (202); and
    discharging the blend out of the extrusion line.

2. The method as recited in claim 1, and further comprising the step of adding one or more of the following into the plastic particles prior to blending and homogenizing the plastic melt with the wood particles: colours, couplers and adhesives, stabilizers, lubricants, or water.

3. The method as recited in claim 2, and further comprising the step of pre-heating the wood particles to a temperature of at least 50 degrees Celsius.

4. The method as recited in claim 3, in which the step of pre-heating the wood particles occurs outside of the extrusion line.

5. The method as recited in claim 1, and further comprising the step of compacting the wood particles, such that a void volume of the wood particles is reduced by at least 10%.

6. The method as recited in claim 1, wherein the plastic melt is injected into the planetary roller part (202) and merged with the wood particles under pressure.

7. The method as recited in claim 6, wherein, in the step of injecting the plastic melt into the planetary roller part (202), the plastic material is sprayed against the wood particles.

8. The method as recited in claim 1, wherein the plastic particles are fed continuously into the side arm extruder and liquefied.

9. The method as recited in claim 1, wherein the feed part (201) is a single-screw extruder.

10. The method as recited in claim 1, wherein the feed part (201) has a single-screw design, wherein the plastic melt is produced in the side arm extruder (204), and wherein the plastic melt is fed between the feed part (201) and the planetary roller part (202).

11. The method as recited in claim 1, wherein the extruder line further includes an intermediate ring (212) interposed between the feed part (201) and the planetary roller part (202).

12. The method as recited in claim 11, wherein the-intermediate ring (212) is equipped with a collar with which the intermediate ring (212) is fixed at a neighboring collar of the feed part (201) and at a neighboring collar of the planetary roller part (202).

13. The method as recited in claim 11, wherein the intermediate ring (212) seizes into an eccentric opening in a neighbouring front face of the feed part (201) or contrary the planetary roller part (202), and the feed part (201) seizes into an eccentric opening at a front face of the intermediate ring (212).

14. The method as recited in claim 1, and further comprising the step of distributing the blend downstream to multiple single-screw extruders (221, 222, 223).

15. The method as recited in claim 14, wherein the step of distributing the blend downstream to multiple single-screw extruders (221, 222, 223) makes use of a distributor.

16. The method as recited in claim 1, wherein the side arm extruder (204) includes a boring extending through an extruder housing and a liner of the planetary roller part (202) which is located therein, and wherein a tube extends into the boring, such that, between the tube extending into the boring and an inner wall of the boring, there is a distance forming a cavity for connecting cooling medium channels or heating medium channels.

17. The method as recited in claim 1, wherein a minimum of 60% of the wood particles have a size of 0.30 to 0.40 mm.

18. The method as recited in claim 1, and further comprising the step of pre-heating the wood particles to a temperature of at least 100 degrees Celsius.

19. The method as recited in claim 1, and further comprising the step of pre-heating the wood particles to a temperature of at least 150 degrees Celsius.

20. The method as recited in claim 1, wherein the plastic particles are fed into the side arm extruder (204) in a batch, liquefied, and then injected by means of a pump into the planetary roller part (202).

21. A method for producing a blend of plant particles and plastic particles in an extrusion line that includes a feed part (201), a side arm extruder (204), and at least one planetary roller part (202) that has a central spindle, multiple planetary spindles, and a surrounding housing, with the multiple planetary spindles rotating about the central spindle in the housing as a result of an internal toothing of the housing, said method comprising the steps of:

feeding the plant particles into the feed part (201), a majority of the plant particles having a size of between 0.3 and 0.4 mm and the plant particles having a maximum size of 0.8 mm;

feeding the plastic particles into the side arm extruder (204) and then, independently of the plant particles, liquefying the plastic particles into a plastic melt;

advancing the plant particles out of the feed part (201) and into the planetary roller part (202);

injecting the plastic melt into the planetary roller part (202) with the plant particles, such that the plant particles have a proportion of at least 60% by weight in the blend;

blending and homogenizing the plastic melt with the plant particles in the planetary roller part (202); and discharging the blend out of the extrusion line.

\* \* \* \* \*